(12) United States Patent
Nada

(10) Patent No.: US 10,811,710 B2
(45) Date of Patent: Oct. 20, 2020

(54) FUEL CELL SYSTEM AND METHOD OF CONTROLLING FUEL CELL SYSTEM

(71) Applicant: TOYOTA JIDOSHA KABUSHIKI KAISHA, Toyota-shi, Aichi-ken (JP)

(72) Inventor: Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 80 days.

(21) Appl. No.: 16/018,388

(22) Filed: Jun. 26, 2018

(65) Prior Publication Data

US 2019/0006689 A1 Jan. 3, 2019

(30) Foreign Application Priority Data

Jun. 29, 2017 (JP) .................................. 2017-127132

(51) Int. Cl.
| | |
|---|---|
| H01M 8/04701 | (2016.01) |
| H01M 10/48 | (2006.01) |
| H01M 16/00 | (2006.01) |
| H02J 7/34 | (2006.01) |
| H01M 10/613 | (2014.01) |

(Continued)

(52) U.S. Cl.
CPC ..... *H01M 8/04701* (2013.01); *H01M 8/0432* (2013.01); *H01M 8/04731* (2013.01); *H01M 10/44* (2013.01); *H01M 10/48* (2013.01); *H01M 10/486* (2013.01); *H01M 10/613* (2015.04); *H01M 16/006* (2013.01); *H02J 7/0091* (2013.01); *H02J 7/34* (2013.01); *H01M 8/04007* (2013.01); *H01M 2220/20* (2013.01); *H01M 2250/20* (2013.01); *H02J 1/00* (2013.01); *H02J 2207/20* (2020.01); *H02J 2300/30* (2020.01)

(58) Field of Classification Search
None
See application file for complete search history.

(56) References Cited

U.S. PATENT DOCUMENTS

| | | | | |
|---|---|---|---|---|
| 8,117,969 | B1 * | 2/2012 | Miller | ....................... B61C 7/04 |
| | | | | 105/26.05 |
| 10,497,995 | B2 * | 12/2019 | Kakeno | ............. H01M 8/04656 |

(Continued)

FOREIGN PATENT DOCUMENTS

| | | |
|---|---|---|
| JP | 2003-333707 A | 11/2003 |
| JP | 2005-045851 | 2/2005 |

(Continued)

*Primary Examiner* — Scott J. Chmielecki
(74) *Attorney, Agent, or Firm* — Finnegan, Henderson, Farabow, Garrett & Dunner, LLP

(57) ABSTRACT

A control unit included in a first fuel cell unit stores a target range set. The target range set includes an SOC control target range, a control target range of temperature of a secondary battery, a control target range for FC temperature, a control target range for temperature of a BDC, a control target range for temperature of a hydrogen pump, and a control target range for temperature of an air compressor. The control unit controls the respective parameters to fall within these target ranges. A control unit included in a second fuel cell unit also stores the target range set. The control unit included in the second fuel cell unit thus similarly controls the respective parameters to fall within the same target ranges, like the control unit included in the first fuel cell unit.

5 Claims, 17 Drawing Sheets

(51) Int. Cl.
  *H01M 8/0432* (2016.01)
  *H01M 10/44* (2006.01)
  *H02J 7/00* (2006.01)
  *H02J 1/00* (2006.01)
  *H01M 8/04007* (2016.01)

(56) References Cited

U.S. PATENT DOCUMENTS

| | | | | |
|---|---|---|---|---|
| 2003/0094923 | A1* | 5/2003 | Emori | B60L 58/15 |
| | | | | 320/126 |
| 2005/0112420 | A1* | 5/2005 | Lai | H01M 8/04567 |
| | | | | 429/432 |
| 2007/0122669 | A1* | 5/2007 | Kusano | H01M 8/04141 |
| | | | | 429/414 |
| 2010/0273079 | A1* | 10/2010 | Hinsenkamp | H01M 8/249 |
| | | | | 429/442 |
| 2012/0308851 | A1* | 12/2012 | Akiyama | H01M 16/006 |
| | | | | 429/9 |
| 2014/0335434 | A1* | 11/2014 | Ikeya | B60H 1/00907 |
| | | | | 429/435 |
| 2015/0021992 | A1 | 1/2015 | Toya | |
| 2015/0099204 | A1* | 4/2015 | O'Neill | H01M 8/249 |
| | | | | 429/431 |
| 2017/0062878 | A1* | 3/2017 | Povey | H01M 8/04649 |
| 2017/0358809 | A1* | 12/2017 | Saito | H01M 8/04201 |
| 2018/0219238 | A1* | 8/2018 | Tanaka | H01M 8/04559 |
| 2018/0342746 | A1* | 11/2018 | Lee | B60L 58/31 |

FOREIGN PATENT DOCUMENTS

| | | |
|---|---|---|
| JP | 2005-45851 | 2/2005 |
| JP | 2005-093185 A | 4/2005 |
| JP | 2014-2016-54600 | 4/2016 |
| JP | 2016-054600 | 4/2016 |
| KR | 101382260 B1 | 4/2014 |

\* cited by examiner

FUEL CELL SYSTEM AND METHOD OF CONTROLLING FUEL CELL SYSTEM

CROSS-REFERENCE TO RELATED APPLICATIONS

The present application claims priority to Japanese patent application No. 2017-127132 filed on Jun. 29, 2017, the entirety of the content of which is hereby incorporated by reference into this application.

BACKGROUND ART

The present disclosure relates to control of a fuel cell.

JP 2016-054600A discloses a motor vehicle mounts on two fuel cell units (driving mechanisms). When an abnormality occurs in one of the two fuel cell units, the motor vehicle disclosed in JP 2016-054600A causes only a secondary battery included in the normal fuel cell unit to be charged with regenerative power and thereby avoids SOC (state of charge) of the secondary battery included in the normal fuel cell unit from becoming excessively high.

In a configuration of a fuel cell system comprised of a plurality of fuel cell units, an output may be limited on each of the fuel cell units. For example, when the SOC of a secondary battery included in one fuel cell unit reaches a lower limit value, this secondary battery is not allowed to be discharged. Thus the output from the fuel cell unit is limited to only the power generated by the fuel cell.

Even when the output is limited on part of the fuel cell units, the normal fuel cell unit serves to compensate for a deficient power by the limitation of the output and accordingly enables the operation of the fuel cell system to be maintained to some extent. Continuing such compensation, however, the normal fuel cell unit is overloaded. This is likely to cause an output of the normal fuel cell unit being also limited and interfere with the operation of the fuel cell system. Considering with such a probability, it is preferable to avoid unlimited compensation by the normal fuel cell unit.

Limitation of the compensation by the normal fuel cell unit may causes a failure to meet an output request. The original cause of such a failure is attributed to a failure in preventing a deterioration of a control parameter (for example, SOC) in the part of the fuel cell units.

In a configuration of a fuel cell system comprised of a plurality of fuel cell units, preventing an increase in deviation of a control parameter between the fuel cell units is desired.

SUMMARY

According to one aspect of the present disclosure, there is provided a fuel cell system comprising a first fuel cell unit and a second fuel cell unit. Each of the first fuel cell unit and the second fuel cell unit comprises a secondary battery configured to supply power to a load; a converter configured to measure an SOC of the secondary battery and to control charging and discharging of the secondary battery; a fuel cell electrically connected with the converter; and a control unit configured to obtain a value of SOC from the converter and to control the converter. The control unit included in the first fuel cell unit performs a control using a control target determined with regard to the SOC of the secondary battery included in the first fuel cell unit. The control unit included in the second fuel cell unit performs a control using a control target determined with regard to the SOC of the secondary battery included in the second fuel cell unit. When the SOC of the secondary battery included in the first fuel cell unit reaches a reference value that is smaller than a minimum value of the control target, the control unit included in the first fuel cell unit limits discharging of the secondary battery included in the first fuel cell unit, and the control unit included in the second fuel cell unit limits discharging of the secondary battery included in the second fuel cell unit. The control targets with regard to the SOC of the secondary battery used by the control unit included in the first fuel cell unit and by the control unit included in the second fuel cell unit have numerical ranges that at least partly overlap with each other. This configuration prevents the occurrence of a deviation with regard to the SOC.

In the fuel cell system of the above aspect, the control unit included in the first fuel cell unit may perform a start-time charging process that charges the secondary battery included in the first fuel cell unit toward a target value using a power generated by the fuel cell included in the first fuel cell unit at a start time of the fuel cell system. The control unit included in the second fuel cell unit may perform a start-time charging process that charges the secondary battery included in the second fuel cell unit toward the target value using a power generated by the fuel cell included in the second fuel cell unit at the start time of the fuel cell system. This configuration shares the target value of SOC at the start time and thereby reduces a deviation of the SOC caused by a previous operation.

In the fuel cell system of the above aspect, the first fuel cell unit may further comprise a fuel cell cooling mechanism configured to cool down the fuel cell included in the first fuel cell unit, and the control unit included in the first fuel cell unit may enhance a cooling capacity of the fuel cell cooling mechanism when charging of the secondary battery included in the first fuel cell unit and power supply to the load are simultaneously performed by using a power generated by the fuel cell included in the first fuel cell unit. This configuration suppresses a temperature rise of the fuel cell when charging of the secondary battery and the power supply to the load are simultaneously performed by using the power generated by the fuel cell.

The fuel cell system of the above aspect may be mounted on a machine having a moving function. The fuel cell cooling mechanism may include a radiator configured to cool down the fuel cell included in the first fuel cell unit. The control unit included in the first fuel cell unit may determine the power generated by the fuel cell included in the first fuel cell unit, based on a cooling capacity of the radiator that is estimated from an ambient temperature and a moving speed of the machine, when the charging of the secondary battery and the power supply to the load are simultaneously performed. This configuration adequately controls the heat value based on the cooling capacity of the radiator and thereby suppresses the temperature of the fuel cell from becoming excessively high.

In the fuel cell system of the above aspect, when a difference by subtracting the SOC of the secondary battery included in the first fuel cell unit from the SOC of the secondary battery included in the second fuel cell unit is equal to or greater than a reference value, the control unit included in the first fuel cell unit may charge the secondary battery included in the first fuel cell unit by using a power generated by the fuel cell included in the first fuel cell unit. This configuration further reduces a deviation with regard to the SOC.

According to another aspect of the present disclosure, there is provided a fuel cell system comprising a first fuel cell unit and a second fuel cell unit. Each of the first fuel cell unit and the second fuel cell unit comprises a secondary battery configured to supply power to a load; a converter configured to control charging and discharging of the secondary battery; a fuel cell electrically connected with the converter; and a control unit configured to control the converter. The control unit included in the first fuel cell unit performs controls with regard to temperatures of the secondary battery and of the converter included in the first fuel cell unit by using control targets respectively determined with regard to the temperatures of the secondary battery and of the converter. The control unit included in the second fuel cell unit performs controls with regard to temperatures of the secondary battery and of the converter included in the second fuel cell unit by using control targets respectively determined with regard to the temperatures of the secondary battery and of the converter. When at least either of a condition that the temperature of the secondary battery included in the first fuel cell unit reaches a first reference value that is higher than a maximum value of the control target and a condition that the temperature of the converter included in the first fuel cell unit reaches a second reference value that is higher than a maximum value of the control target is satisfied, the control unit included in the first fuel cell unit limits discharging of the secondary battery included in the first fuel cell unit, and the control unit included in the second fuel cell unit limits discharging of the secondary battery included in the second fuel cell unit. At least either of the control targets with regard to the temperature of the secondary battery and the control targets with regard to the temperature of the converter that are used by the control unit included in the first fuel cell unit and by the control unit included in the second fuel cell unit have numerical ranges that at least partly overlap with each other. This configuration prevents the occurrence of at least one of deviations with regard to the secondary battery and the converter.

In the fuel cell system of the above aspect, the first fuel cell unit may further comprise an auxiliary machinery cooling mechanism configured to cool down the converter, and the control unit included in the first fuel cell unit may enhance a cooling capacity of the auxiliary machinery cooling mechanism when the secondary battery is charged. This configuration suppresses a temperature rise of the converter when the secondary battery is charged.

In the fuel cell system of the above aspect, when a difference by subtracting the temperature of the converter included in the first fuel cell unit from the temperature of the converter included in the second fuel cell unit is equal to or greater than a reference value, the control unit included in the second fuel cell unit may perform a process to cool down the converter included in the second fuel cell unit. This configuration further reduces a deviation with regard to the temperature of the converter.

In the fuel cell system of the above aspect, when a difference by subtracting the temperature of the secondary battery included in the first fuel cell unit from the temperature of the secondary battery included in the second fuel cell unit is equal to or greater than a reference value, the control unit included in the second fuel cell unit may perform a process to cool down the secondary battery included in the second fuel cell unit. This configuration further reduces a deviation with regard to the temperature of the secondary battery.

According to another aspect of the present disclosure, there is provided a fuel cell system comprising a first fuel cell unit and a second fuel cell unit. Each of the first fuel cell unit and the second fuel cell unit comprises a fuel cell; and a control unit configured to control power generation of the fuel cell. The control unit included in the first fuel cell unit performs a control using a control target with regard to a temperature of the fuel cell included in the first fuel cell unit. The control unit included in the second fuel cell unit performs a control using a control target with regard to a temperature of the fuel cell included in the second fuel cell unit. When the temperature of the fuel cell included in the first fuel cell unit reaches a reference value that is larger than a maximum value of the control target, the control unit included in the first fuel cell unit limits electric power generated by the fuel cell included in the first fuel cell unit. When the 1 power generated by the fuel cell included in the first fuel cell unit is limited, the control unit included in the second fuel cell unit makes compensation to compensate for at least part of a deficient power by the limitation with a power generated by the fuel cell included in the second fuel cell unit. The control targets used by the control unit included in the first fuel cell unit and by the control unit included in the second fuel cell unit have numerical ranges that at least partly overlap with each other. This configuration prevents the occurrence of a deviation with regard to the temperature of the fuel cell.

In the fuel cell system of the above aspect, the second fuel cell unit may further comprise a fuel cell cooling mechanism configured to cool down the fuel cell. The control unit included in the second fuel cell unit may enhance a cooling capacity of the fuel cell cooling mechanism, when the compensation is made. This configuration suppresses a temperature rise of the fuel cell when the compensation is made.

The fuel cell system of the above aspect may be mounted on a machine having a moving function. The fuel cell cooling mechanism may include a radiator. The control unit included in the second fuel cell unit may determine an upper limit of the power generated by the fuel cell included in the second fuel cell unit, based on a cooling capacity of the radiator that is estimated from an ambient temperature and a moving speed of the machine, when the compensation is made. This configuration adequately controls the heat value based on the cooling capacity of the radiator and thereby suppresses the temperature of the fuel cell from becoming excessively high.

In the fuel cell system of the above aspect, when a difference by subtracting the temperature of the fuel cell included in the second fuel cell unit from the temperature of the fuel cell included in the first fuel cell unit is equal to or greater than a reference value, the control unit included in the first fuel cell unit may perform a process to cool down the fuel cell included in the first fuel cell unit. This configuration further reduces a deviation with regard to the temperature of the fuel cell.

According to another aspect of the present disclosure, there is provided a fuel cell system comprising a first fuel cell unit and a second fuel cell unit. Each of the first fuel cell unit and the second fuel cell unit comprises a secondary battery configured to supply power to a load; a converter configured to measure an SOC of the secondary battery and to control charging and discharging of the secondary battery; a fuel cell electrically connected with the converter; and a control unit configured to obtain a value of SOC from the converter and to control the converter and the fuel cell. The control unit included in the first fuel cell unit and the control unit included in the second fuel cell unit share a numerical range for a control parameter to control powers output from the respective fuel cell units.

DESCRIPTION OF EMBODIMENTS

Figure 1:
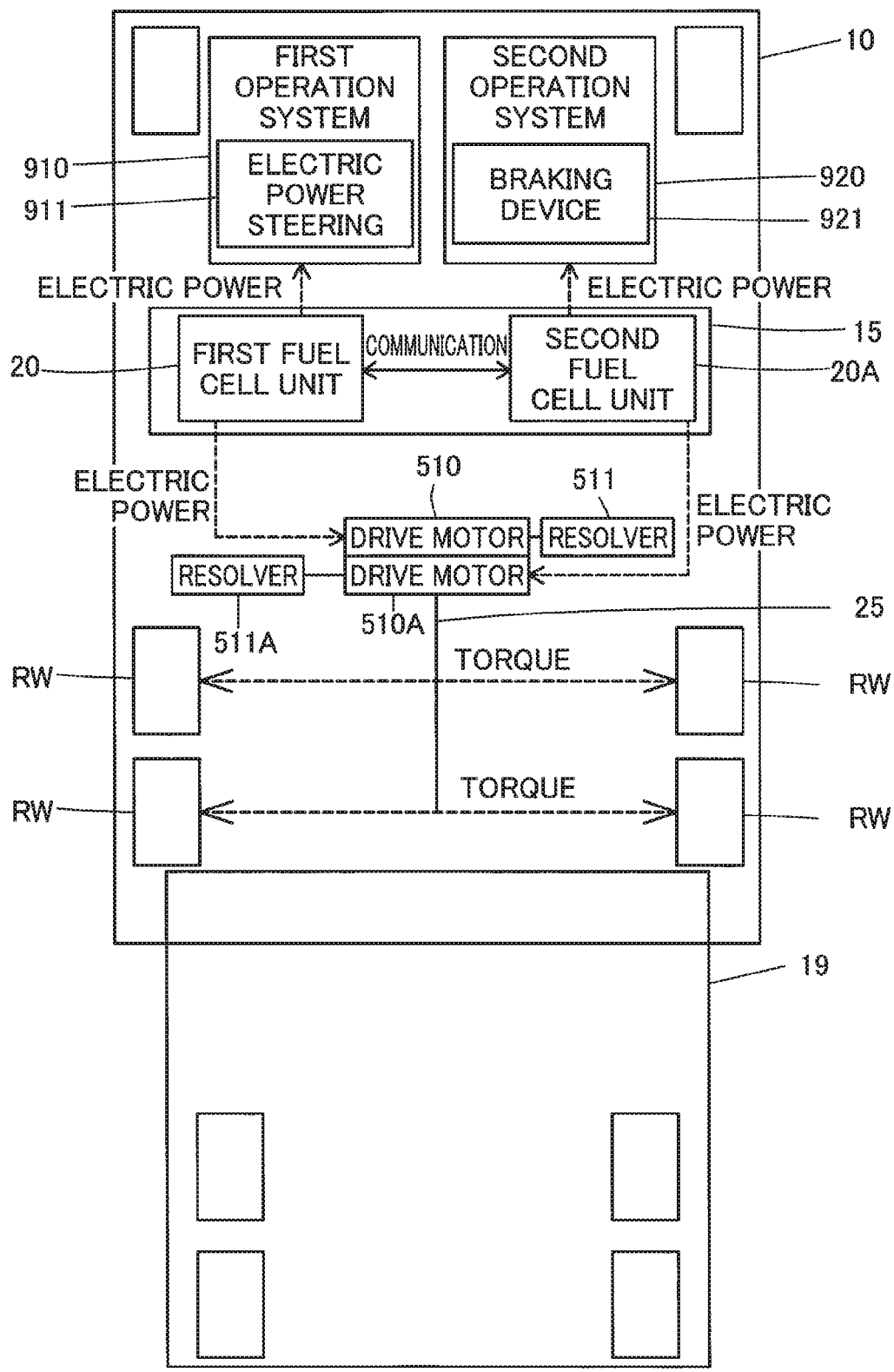
FIG. 1 is a configuration diagram illustrating a fuel cell vehicle.

The following describes Embodiment 1. FIG. 1 illustrates a fuel cell vehicle 10. The fuel cell vehicle 10 is a motor truck pulling a trailer 19. The fuel cell vehicle 10 includes a fuel cell system 15, a propeller shaft 25, a drive motor 510, a drive motor 510A, a resolver 511, a resolver 511A, a first operation system 910 and a second operation system 920. The fuel cell system 15 is comprised of a first fuel cell unit 20 and a second fuel cell unit 20A.

The first operation system 910 and the second operation system 920 collectively designate devices operated by the driver for driving. The first operation system 910 receives power supply from the first fuel cell unit 20. The second operation system 920 receives power supply from the second fuel cell unit 20A. The first operation system 910 includes an electric power steering 911. The second operation system 920 includes a braking device 921. Both the electric power steering 911 and the braking device 921 consume electric power.

The first fuel cell unit 20 supplies electric power to the drive motor 510. The second fuel cell unit 20A supplies electric power to the drive motor 510A. Torques generated by the drive motors 510 and 510A are transmitted via one propeller shaft 25 to four rear wheels RW. The resolver 511 serves to measure a rotation speed of the drive motor 510. The resolver 511A serves to measure a rotation speed of the drive motor 510A.

The drive motors 510 and 510A are coupled with each other to rotate one propeller shaft 25, so that the drive motors 510 and 510A have identical rotation speeds. The drive motors 510 and 510, however, generate different torques when a value of power supplied to the drive motor 510 is different from a value of power supplied to the drive motor 510A.

Figure 2:
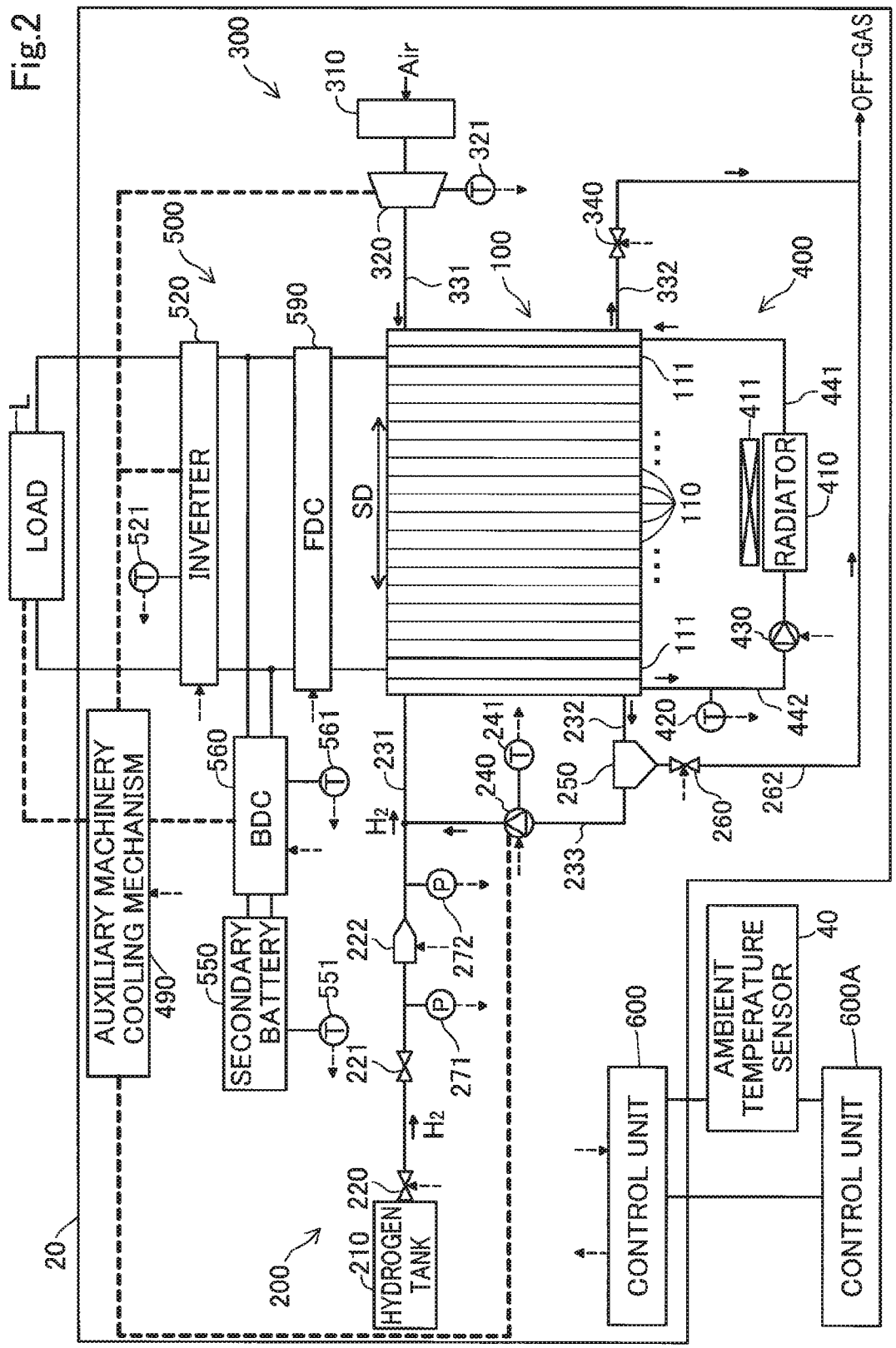
FIG. 2 is a block diagram illustrating the schematic configuration of a first fuel cell unit.

FIG. 2 is a block diagram illustrating the schematic configuration of the first fuel cell unit 20. The first fuel cell unit 20 includes a fuel cell 100, a fuel gas supply discharge mechanism 200, an oxidizing gas supply discharge mechanism 300, an FC cooling mechanism 400, an auxiliary machinery cooling mechanism 490, a power charge discharge mechanism 500, and a control unit 600.

The fuel cell 100 is a polymer electrolyte fuel cell and includes a cell stack comprised of a plurality of unit cells 110 stacked along a stacking direction SD, and a pair of current collectors 111 placed on respective ends of the cell stack to serve as general electrodes.

The fuel gas supply discharge mechanism 200 is configured to supply a fuel gas to the fuel cell 100 and discharge an anode off-gas from the fuel cell 100. The fuel gas supply discharge mechanism 200 includes a hydrogen tank 210, a shutoff valve 220, a pressure regulator 221, an injector 222, a gas liquid separator 250, a hydrogen pump 240, a hydrogen pump temperature sensor 241, a purge valve 260, a fuel gas supply path 231, a first fuel gas discharge path 232, a fuel gas circulation path 233, a second fuel gas discharge path 262, a first pressure sensor 271, and a second pressure sensor 272.

The hydrogen tank 210 serves to store high-pressure hydrogen. The shutoff valve 220 is placed in the vicinity of a supply port of the fuel gas in the hydrogen tank 210 and is closed during no supply of hydrogen gas from the hydrogen tank 210.

The pressure regulator 221 is placed on a downstream side of the shutoff valve 220 and on an upstream side of the injector 222 in the fuel gas supply path 231. The pressure regulator 221 serves to reduce the pressure of hydrogen.

The injector 222 is placed on a downstream side of the pressure regulator 221 in the fuel gas supply path 231 to inject the hydrogen gas to the fuel cell 100. The injector 222 serves to regulate the flow rate of the hydrogen gas to the fuel cell 100.

The gas liquid separator 250 is placed in the first fuel gas discharge path 232 and serves to separate water included in the anode off-gas discharged from the fuel cell 100 and discharge the separated water to the second fuel gas discharge path 262 and discharge the gas after separation of water to the fuel gas circulation path 233.

The hydrogen pump 240 is placed in the fuel gas circulation path 233 and serves to supply the fuel gas discharged from the gas liquid separator 250 to the fuel gas supply path 231. The hydrogen pump temperature sensor 241 serves to measure the temperature of the hydrogen pump 240. The purge valve 260 is placed in the second fuel gas discharge path 262 and is opened to allow the water separated by the gas liquid separator 250 to be released to the atmosphere.

The gas liquid separator 250 communicates with the fuel cell 100 via the first fuel gas discharge path 232. The gas liquid separator 250 communicates with the atmosphere via the second fuel gas discharge path 262 when the purge valve 260 is opened. When the purge valve 260 is opened, water accumulated in the gas liquid separator 250 is discharged to the second fuel gas discharge path 262.

The first pressure sensor 271 serves to measure a pressure between the pressure regulator 221 and the injector 222 in the fuel gas supply path 231. The second pressure sensor 272 serves to measure a pressure between the injector 222 and the fuel cell 100 in the fuel gas supply path 231.

The oxidizing gas supply discharge mechanism 300 is configured to supply an oxidizing gas to the fuel cell 100 and discharge a cathode off-gas from the fuel cell 100. The oxidizing gas supply discharge mechanism 300 includes an air cleaner 310, an air compressor 320, an air compressor temperature sensor 321, a back pressure valve 340, an oxidizing gas supply path 331 and an oxidizing gas discharge path 332.

The air cleaner 310 serves to trap foreign substances such as dust in the air by means of a filter provided inside thereof and supply the air after removal of the foreign substances to the air compressor 320. The air compressor 320 serves to compress the air supplied from the air cleaner 310 and cause the compressed air to be flowed into the oxidizing gas supply path 331. The air compressor temperature sensor 321 serves to measure the temperature of the air compressor 320.

The back pressure valve 340 is placed in the oxidizing gas discharge path 332 and serves to regulate the pressure on a cathode discharge side of the fuel cell 100. The oxidizing gas discharge path 332 is connected with the second fuel gas discharge path 262. Along with the water and the anode off-gas discharged through the second fuel gas discharge path 262, water and the cathode off-gas discharged through the oxidizing gas discharge path 332 are released to the atmosphere.

The FC cooling mechanism 400 includes a radiator 410, a cooling medium discharge path 442, a cooling medium supply path 441, a water pump 430 and an FC temperature sensor 420. The radiator 410 is connected with the cooling medium discharge path 442 and with the cooling medium supply path 441 and serves to cool down the cooling medium flowing in from the cooling medium discharge path 442 by blowing the air using an electric fan 411 or the like and discharge the cooled-down cooling medium to the cooling medium supply path 441.

The cooling medium discharge path 442 is connected with a cooling medium discharge manifold provided in the fuel cell 100, and the cooling medium supply path 441 is connected with a cooling medium supply manifold provided in the fuel cell 100. Accordingly, the cooling medium discharge path 442, the radiator 410, the cooling medium supply path 441 and the manifolds provided in the fuel cell 100 form a circulation path of the cooling medium. The FC temperature sensor 420 is placed in the vicinity of the fuel cell 100 in the cooling medium discharge path 442 and serves to measure the temperature of the cooling medium discharged from the fuel cell 100. The measurement value by the FC temperature sensor 420 is called FC temperature. The FC temperature is assumed to be equal to the temperature of the fuel cell 100.

The power charge discharge mechanism 500 is configured to supply electric power output from the fuel cell 100 and/or a secondary battery 550 to a load L. The load L includes the drive motor 510 and the first operation system 910.

The power charge discharge mechanism 500 includes an inverter 520, an inverter temperature sensor 521, a secondary battery 550, a secondary battery temperature sensor 551, a BDC 560, a BDC temperature sensor 561 and an FDC 590.

The secondary battery 550 is a lithium ion rechargeable battery and is more specifically a lithium titanate battery. The secondary battery temperature sensor 551 serves to measure the temperature of the secondary battery 550.

The inverter 520 is connected in parallel to the fuel cell 100 and the secondary battery 550 and serves to convert direct current supplied from the fuel cell 100 and/or the secondary battery 550 into alternating current and supply the alternating current to the load L.

The BDC 560 is a DC-DC converter. The BDC 560 serves to step up the output voltage of the secondary battery 550 and supply the stepped-up voltage to the inverter 520. The BDC 560 also serves to step down the output voltage of the fuel cell 100 and supply the stepped-down voltage to the secondary battery 550, with a view to accumulating the excess power generated by the fuel cell 100. The BDC 560 measures an SOC of the secondary battery 550. The SOC is an acronym of "State Of Charge". The control unit 600 stores a lower limit value (threshold value) in a practical use range of SOC that is determined in advance to prevent the SOC from becoming 0% and controls the SOC to be not lower than this lower limit value. The BDC temperature sensor 561 serves to measure the temperature of the BDC 560.

The BDC 560 according to the embodiment is a term denoting a group of components including a control unit and sensors associated with the secondary battery 550, in addition to a circuit configured to step down the output voltage.

The FDC 590 is a DC-DC converter. The FDC 590 serves to control the electric current and the voltage generated by the fuel cell 100. The fuel cell 100 is electrically connected with the BDC 560 via the FDC 590. The fuel cell 100 is also electrically connected with the inverter 520 via the FDC 590.

Like the FC cooling mechanism 400, the auxiliary machinery cooling mechanism 490 includes a radiator and an electric fan and is configured to cool down auxiliary machines by taking advantage of circulation of the cooling medium. The auxiliary machines herein include the hydrogen pump 240, the air compressor 320, the inverter 520 and the BDC 560. The auxiliary machinery cooling mechanism 490 is also configured to cool down part of the load L. The part of the load L means the drive motor 510. The auxiliary machinery cooling mechanism 490 according to the embodiment is configured to cool down these cooling objects by the cooling medium flowing in an identical circulation path.

Figure 3:
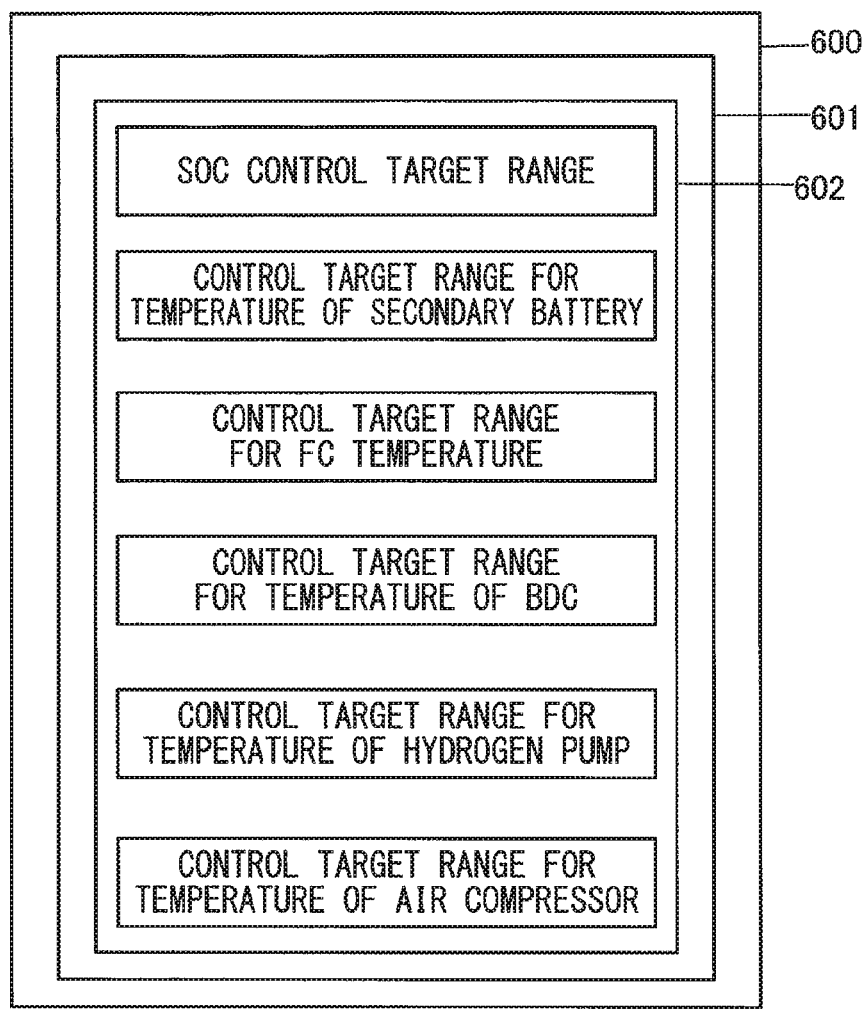
FIG. 3 is a diagram illustrating a target range set stored in one control unit.

FIG. 3 is a diagram illustrating storage of a target range set 602 in a storage medium 601. The storage medium 601 is provided in the control unit 600. The target range set 602 denotes information as a set of target ranges of respective parameters. The target range set 602 includes an SOC control target range, a control target range for the temperature of the secondary battery 550, a control target range for the FC temperature, a control target range for the temperature of the BDC 560, a control target range for the temperature of the hydrogen pump 240, and a control target range for the temperature of the air compressor 320. Each of the control target ranges is defined by numerical values as a minimum value and a maximum value.

These target ranges denote appropriately operable ranges of the respective components. Reference values as an upper limit value and a lower limit value that work as triggers to restrict the operation of each component are determined separately. The target value is determined as the range, in order to prevent hunting.

In order to prevent the FC temperature from becoming higher than the control target range, the control unit 600 receives measurement values from an ambient temperature sensor 40 and the FC temperature sensor 420 and performs feedback control of the operations of the radiator 410 and the electric fan 411. As shown in FIG. 2, one ambient temperature sensor 40 is mounted on the fuel cell vehicle 10. The control unit 600 performs a warm-up operation when the FC temperature is lower than the control target range.

In order to prevent the temperatures of the hydrogen pump 240, the air compressor 320, the inverter 520, the BDC 560 and the drive motor 510 from becoming higher than the respective control target ranges, the control unit 600 receives measurement values from temperature sensors attached to these components and performs feedback control of the operations of the auxiliary machinery cooling mechanism 490 and reduction of the heat value. The heat value is reduced by reducing the rotation speeds of the hydrogen pump 240, the air compressor 320 and the drive motor 510, while being reduced by limiting charge and discharge of the secondary battery 550 with regard to the BDC 560.

The control unit 600 performs the warm-up operation when the temperatures of the hydrogen pump 240, the air compressor 320 and the drive motor 510 are lower than the respective control target ranges. The control target range for the BDC 560 does not have any specified lower limit value. Accordingly, the control unit 600 does not perform any process to raise the temperature of the BDC 560. This is because the BDC 560 is not expected to have any trouble caused by an excessively low temperature under actual use conditions.

The control unit 600 controls the temperature of the secondary battery 550 to be not higher than the control target range for the temperature of the secondary battery 550. The secondary battery 550 is, however, not a cooling object of the auxiliary machinery cooling mechanism 490. Accordingly, the secondary battery 550 is cooled down by natural heat dissipation. According to another embodiment, the secondary battery 550 may be cooled down by water cooling of the auxiliary machinery cooling mechanism 490.

The control unit 600 controls the temperature of the secondary battery 550 to be not lower than the control target range for the temperature of the secondary battery 550. More specifically, the control unit 600 charges and discharges the secondary battery 550 at low power.

The control unit 600 controls the SOC of the secondary battery 550 to fall within the SOC control target range, based on the measurement value of the BDC 560. Accordingly, the control unit 600 discharges the secondary battery 550 when the value of SOC is excessively high, while charging the secondary battery 50 when the value of SOC is excessively low.

The secondary battery 550 is discharged when the value of SOC is excessively high. This is because leaving the state of the excessively high SOC value may cause a failure to charge the secondary battery 55 even when a regenerative power is generated.

The secondary battery 550 is charged, on the other hand, when the value of SOC is excessively low. This aims for preparation to control the output of the drive motors 510 and 510A to a large value. According to the embodiment, when the driver presses down the accelerator pedal, the electric power generated by the fuel cells 100 and 100A and the electric power fed from the secondary batteries 550 and 550A are simultaneously supplied to the drive motors 510 and 510A. In the case of an excessively low SOC, the amount of discharge from the secondary batteries 550 and 550A is insufficient, and the output of the drive motors 510 and 510A fails to meet a required output.

The secondary battery 550 may be charged by using the regenerative power by the drive motor 510 or by using the power generated by the fuel cell 100. The regenerative power by the drive motor 510 depends on running of the fuel cell vehicle 10. The power generated by the fuel cell 100 is thus mainly used for the control to approach to a control target value.

The components of the second fuel cell unit 20A are identical with the components of the first fuel cell unit 20. In principle, the first fuel cell unit 20 and the second fuel cell unit 20A are operated under identical conditions. For example, in principle, the value of power supplied to the drive motor 510 by the first fuel cell unit 20 is equal to the value of power supplied to the drive motor 510A by the second fuel cell unit 20A.

The reference signs of the respective components of the second fuel cell unit 20A have A as the suffix. The same reference signs are allocated to the same components except the suffix A. For example, as shown in FIG. 2, the second fuel cell unit 20A includes a control unit 600A. The other components of the second fuel cell unit 20A are omitted from the illustration, but the reference signs with the suffix A are used to explain the components of the second fuel cell unit 20A in the description hereof.

Figure 4:
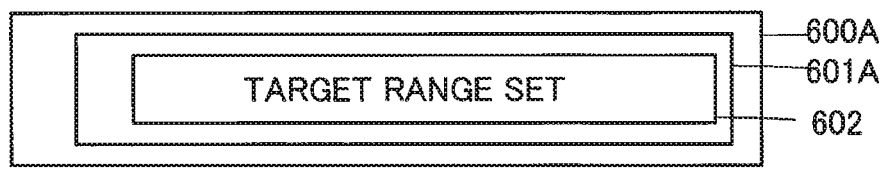
FIG. 4 is a diagram illustrating a target range set stored in the other control unit.

FIG. 4 is a diagram illustrating storage of a target range set 602 in a storage medium 601A. The storage medium 601A is provided in the control unit 600A. The contents of the target range set 602 stored in the control unit 600A are identical with the contents of the target range set 602 stored in the control unit 600. Accordingly, their control target ranges completely overlap with regard to any parameter.

The control units 600 and 600A share the target range set 602. Each of the parameters is thus controlled to an identical target by the control units 600 and 600A and accordingly gives close values to have a small deviation.

The following describes charging the secondary battery 550 to cause the value of SOC to fall within the SOC control target range.

The value of SOC may have a deviation even immediately after a start of the fuel cell system 15. One reason for such a deviation is a difference in power consumption between the first operation system 910 and the second operation system 920.

A start of the fuel cell system 15 is triggered by a press of a power switch of the fuel cell vehicle 10 when the fuel cell vehicle 110 is in a parked state. The driver presses the power switch to shift the fuel cell vehicle 10 from the parked state to a drivable state. The driver also presses the power switch to shift the fuel cell vehicle 10 from the drivable state to the parked state. When the fuel cell vehicle 10 is in the parked state, the fuel cell system 15 is at a stop. A start of the fuel cell system 15 includes a series of processes to stabilize the operation of the fuel cell system 15, for example, warm-up operations of the fuel cells 100 and 100A. A start time of the fuel cell system 15 denotes a time period from a press of the power switch to substantial completion of the series of processes. Immediately after a start of the fuel cell system 15 means immediately after a start of the fuel cell system 15 is triggered.

When a deviation of SOC occurs by a difference in power consumption between the first operation system 910 and the second operation system 920, restarting the fuel cell system 15 to resume running of the fuel cell vehicle 10 is likely to further increase the deviation.

Figure 5:
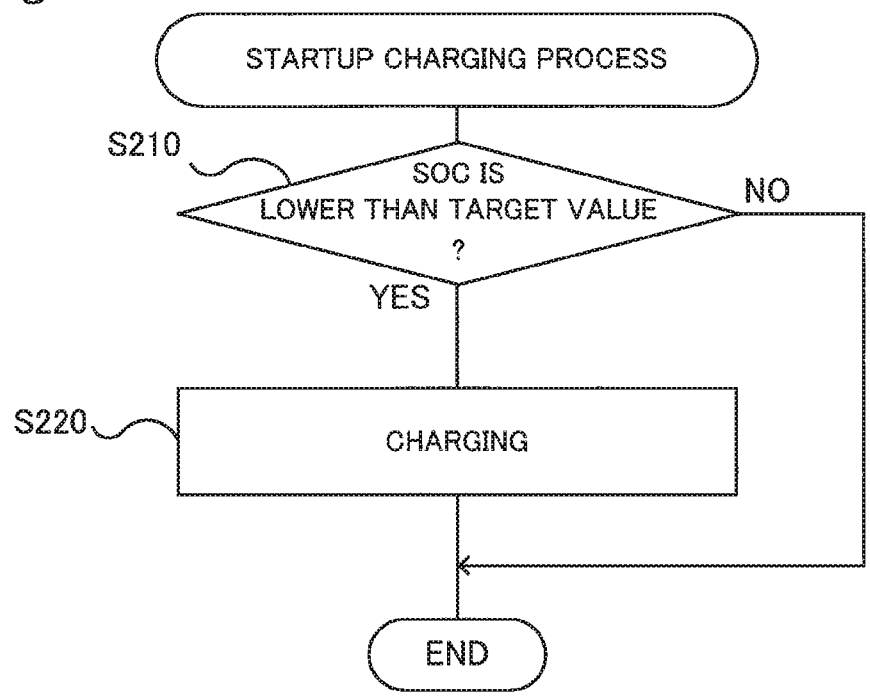
FIG. 5 is a flowchart showing a start-time charging process.

Accordingly, the control units 600 and 600A respectively perform a start-time charging process shown in FIG. 5 at the start time of the fuel cell system 15. After a press of the power switch, charging of the secondary batteries 550 and 550A takes priority over power supply to the drive motors 510 and 510A until termination of the start-time charging process. For example, when the driver depresses the accelerator pedal, the amount of power supply to the drive motors 510 and 510A is reduced to be smaller than a proper amount of power supply determined according to the depression amount of the accelerator pedal or to be zero. This specification is employed for the fuel cell vehicle 10 since the fuel cell vehicle 10 is a commercial vehicle.

The following describes the start-time charging process performed by the control unit 600 as the execution subject. The control units 600 and 600A perform an identical series of processing with regard to each of other processes described later. These processes are also described in the case of the control unit 600 as the execution subject.

The control unit 600 first determines whether the SOC of the secondary battery 550 is lower than a target value (S210). The target value herein denotes any value in the SOC control target range included in the target range set 602. The target value according to the embodiment is equal to the maximum value of the SOC control target range.

When the SOC is lower than the target value (S210: YES), the control unit 600 charges the secondary battery 550 (S220) and terminates the start-time charging process. The secondary battery 550 is charged at S220 by using the power generated by the fuel cell 100. When the SOC is equal to or higher than the target value (S210: NO), the control unit 600 skips S220 and terminates the start-time charging process.

After termination of the start-time charging process, the control units 600 and 600A perform the control of causing the value of SOC to fall within the SOC control target range as described above.

In the control of causing the value of SOC to fall within the SOC control target range, in the case of charging the secondary battery 550 with the power generated by the fuel cell 100, charging the secondary battery 550 with a maximum chargeable power may cause the FC temperature to be excessively high. Accordingly, in the case of charging the secondary battery 550, the control unit 600 controls the power generation of the fuel cell 100 by additionally taking into account the capacity of cooling the fuel cell 100. The following describes this control in detail.

Figure 6:
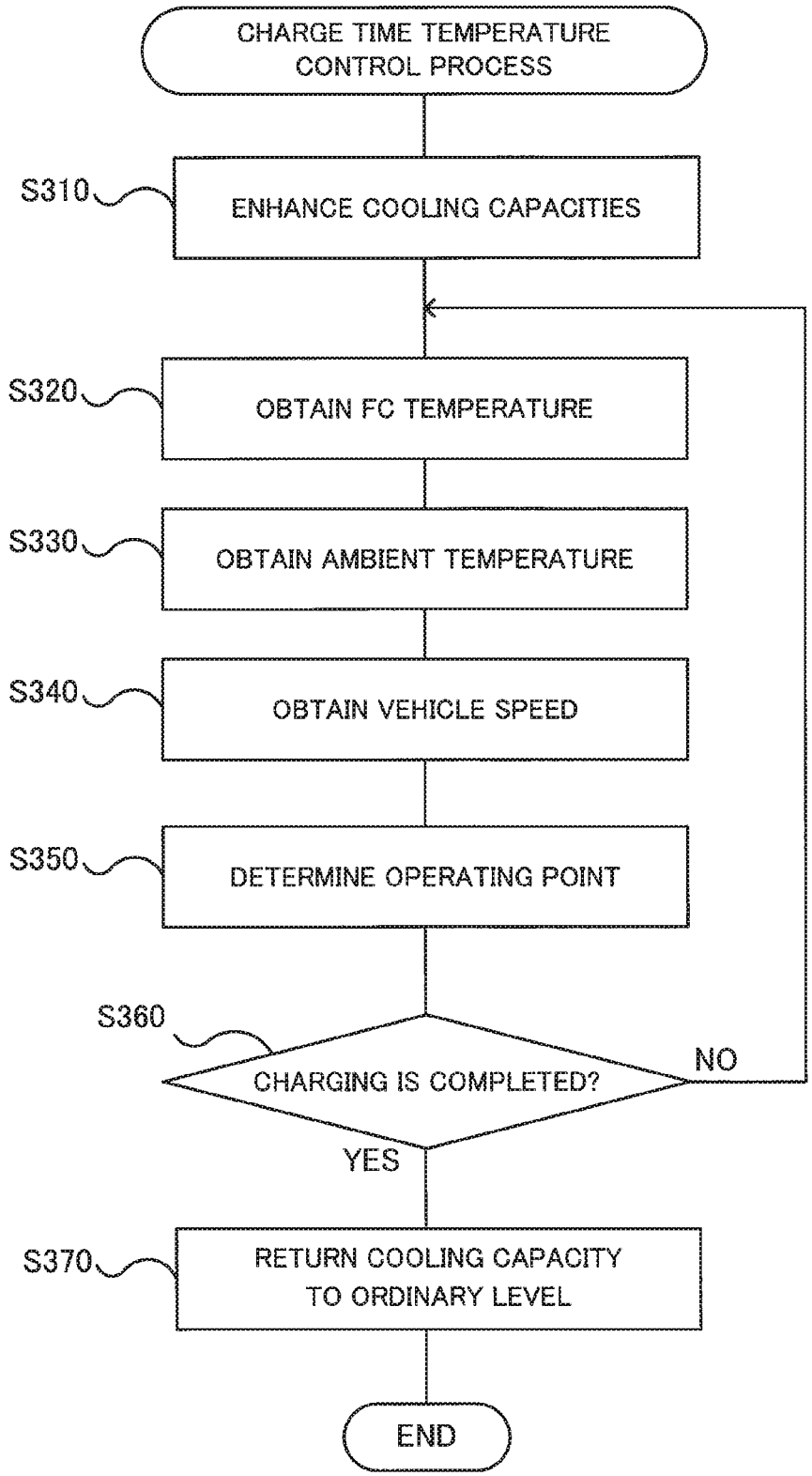
FIG. 6 is a flowchart showing a charging-time temperature control process.

FIG. 6 is a flowchart showing a charging-time temperature control process. The control unit 600 starts the charging-time temperature control process, in response to a start of charging the secondary battery 550 with the power generated by the fuel cell 100, as a trigger. More specifically, the charging-time temperature control process is not triggered by a start of a rise of the FC temperature and the like but is triggered by a start of charging that is regarded as a situation expected to raise the FC temperature and the like.

The control unit 600 performs the control of causing the value of SOC to fall within the SOC control target range that is included in the target range set 602 even when the power generated by the fuel cell 100 is supplied to the drive motor 510. In other words, charging with the power generated by the fuel cell 100 is not prohibited only on the grounds that the power generated by the fuel cell 100 is supplied to the drive motor 510. Accordingly, the charging-time temperature control process is performed when the power generated by the fuel cell 100 is supplied to the drive motor 510 and the secondary battery 550 or when the power generated by the fuel cell 100 is supplied to the secondary battery 550. According to the embodiment, the charging-time temperature control process is not performed exceptionally during execution of the start-time charging process. This is because the FC temperature is more likely to be lower than the control target range at the start time.

The control unit 600 first enhances the cooling capacities of the FC cooling mechanism 400 and the auxiliary machinery cooling mechanism 490 (S310). More specifically, with regard to the FC cooling mechanism 400, the control unit 600 increases the rotation speed of the water pump 430 and the rotation speed of the electric fan 411 of the radiator 410. With regard to the auxiliary machinery cooling mechanism 490, the control unit 600 similarly increases the rotation speed of a water pump and the rotation speed of the electric fan of the radiator. The cooling capacities are set to their maximum values in respective continuous usable ranges at step S310 according to the embodiment.

The reason for increasing the cooling capacity of the FC cooling mechanism 400 is that the heat value of the fuel cell 100 increases with an increase in power generation amount for the purpose of charging. The reason for increasing the cooling capacity of the auxiliary machinery cooling mechanism 490 is that the heat values of the BDC 560, the hydrogen pump 240 and the air compressor 320 increase accompanied with charging.

Subsequently, the control unit 600 obtains the FC temperature (S320), obtains the ambient temperature (S330), obtains the vehicle speed (S340) and determines an operating point of the fuel cell 100 (S350). The processing of S320 to S350 is described below with reference to FIGS. 7 and 8.

Figure 7:
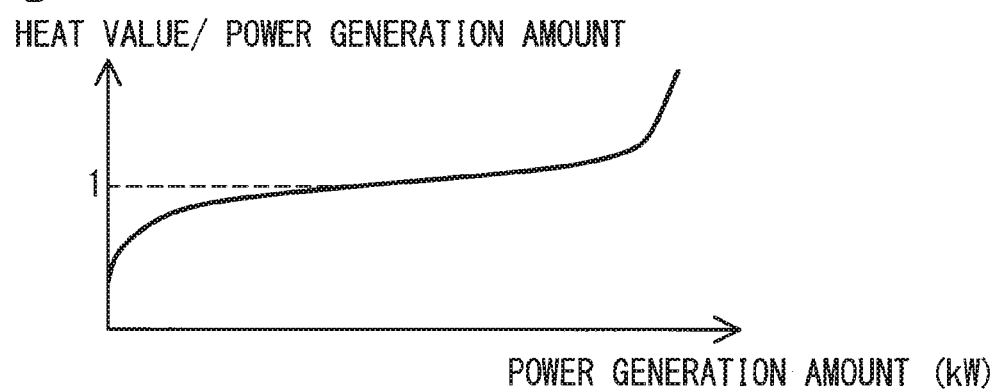
FIG. 7 is a graph showing an exothermic characteristic in power generation of a fuel cell.

FIG. 7 is a graph showing a general exothermic characteristic in power generation of a fuel cell. The fuel cell 100 also has this characteristic. The ordinate shows a ratio of the heat value to the power generation amount (dimensionless number). In the description below, this ratio is called heat generation ratio KL. The abscissa shows the power generation amount. The operating point is to be changed, in order to increase the power generation amount. More specifically, the operating point is changed by decreasing the generated voltage and increasing the generated current. In this case, the heat generation ratio KL also increases with an increase in power generation amount as shown in FIG. 7.

Figure 8:
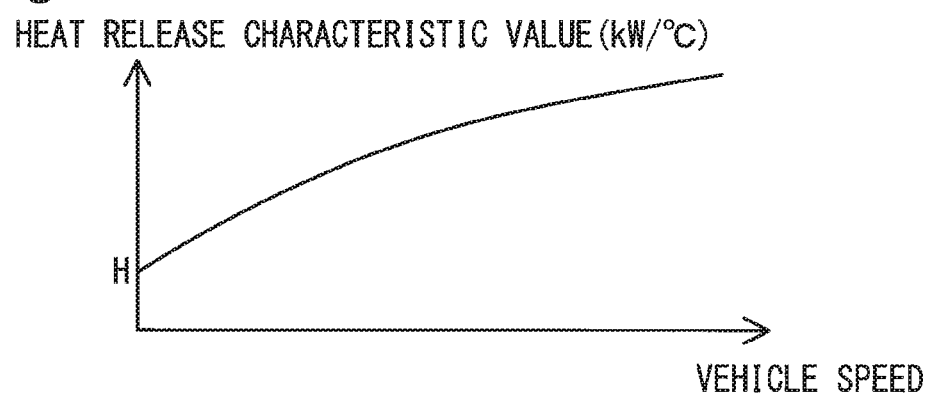
FIG. 8 is a graph showing a relationship of a heat release characteristic value by a radiator to vehicle speed.

FIG. 8 is a graph showing a relationship of a heat release characteristic value KF (kW/° C.) by the radiator 410 to vehicle speed. The heat release characteristic value KF is a parameter indicating the heat release amount that depends on a temperature difference between the temperature of a cooling medium and the ambient temperature. As shown in FIG. 8, the heat release characteristic value KF becomes greater than zero by the operation of the electric fan 411 even at the vehicle speed of zero. A value H shown in FIG. 8 is obtained by the processing of S310.

As shown in FIG. 8, an increase in vehicle speed causes the running wind to blow against the radiator 410 and accelerates the heat dissipation, thus increasing the heat release characteristic value KF.

On the premise of FIGS. 7 and 8, a cooling capacity Qc by the radiator 410 is shown by simplified Expression (1) given below:

$$Qc = KF(Tw - Ta) \quad (1)$$

where Ta denotes the ambient temperature, and Tw denotes the FC temperature.

In simplified terms, the FC temperature does not change when the cooling capacity Q is equal to the heat value of the fuel cell 100. Assuming the cooling capacity Qc is equal to the heat value of the fuel cell 100, Expression (2) given below is provided from the definition of the heat generation ratio KL:

$$Qfc = Qc/KL \quad (2)$$

where Qfc denotes the power generation amount by the fuel cell 100.

It is only necessary to satisfy Expression (2) when Tw in Expression (1) is substituted with Twmx, where Twmx denotes an allowable FC temperature as the condition of continuous operation. Expression (3) given below is provided by substituting Expression (1) having Tw substituted with Twmx into Expression (2):

$$Pfc = KF(Twmx - Ta)/KL \quad (3)$$

Pfc denotes the power generation amount Qfc that can be continuously output from the fuel cell 100. The power generation amount expressed by Pfc above is called rated power generation amount Pfc. For example, in the case of charging the secondary battery 550, the control unit 600 controls power generation of the fuel cell 100 using the values of the ambient temperature, the vehicle speed and the FC temperature, so as not to exceed the rated power generation amount Pfc. The control unit 600 calculates the vehicle speed from the measurement result of the resolver 511. The control unit 600 stores in advance the temperature Twmx as a fixed value. The processing of S320 to S350 described above is a series of processing to implement power generation with the rated power generation amount Pfc.

The heat value of the fuel cell 100 may be adequately controlled by charging with the rated power generation amount Pfc according to various running conditions. For example, in the case where the fuel cell vehicle 10 runs at a constant speed on a horizontal road or in the case where the fuel cell vehicle 10 runs on a downhill road with the zero torque generated by the drive motors 510 and 510A, there is a small required output for the fuel cells 100 and 100A and the cooling effect by the running wind is expected. In such cases, the SOC can be increased in a short time period because of the large rated power generation amount Pfc and the large electric power allocated for charging.

After S350, the control unit 600 determines whether charging is completed (S360). More specifically, the control unit 600 determines whether the value of SOC falls within the SOC control target range. When charging is not completed (S360: NO), the control unit 600 repeats the processing of S320 to S350. When charging is completed (S360: YES), the control unit 600 returns the cooling capacity of the FC cooling mechanism 400 to a level of ordinary operation (S370) and terminates the charging-time temperature control process.

Execution of the charging-time temperature control process enables the secondary battery 550 to be charged with the power generated by the fuel cell 100 in most cases except the case of a high load that requires discharging of the secondary battery 550, for example, in the case of significant acceleration or in the case of going up a hill. According to the embodiment, charging is performed frequently by setting a minimum value of the SOC control target range to a value close to an upper limit value in the practical use range of SOC. This satisfies both the condition that the FC temperature does not reach a reference value and that the SOC is kept at a high level. As a result, this prepares for the case of a high load that requires discharging of the secondary battery 550.

Controlling the power generation not to exceed the rated power generation amount Pfc is not limited during execution of the charging-time temperature control process. For example, the condition of not exceeding the rated power generation amount Pfc is imposed in the case of compensation for a deficiency of the power generated by the other fuel cell unit as described later.

As shown in FIG. 2, the control unit 600 and the control unit 600A are connected with each other by wire to make communication. The purpose of communication between the control unit 600 and the control unit 600A is notification of output limitation in one fuel cell unit due to a failure in normal power generation of the fuel cell or normal discharge from the secondary battery to a control unit belonging to the other fuel cell unit.

Figure 9:
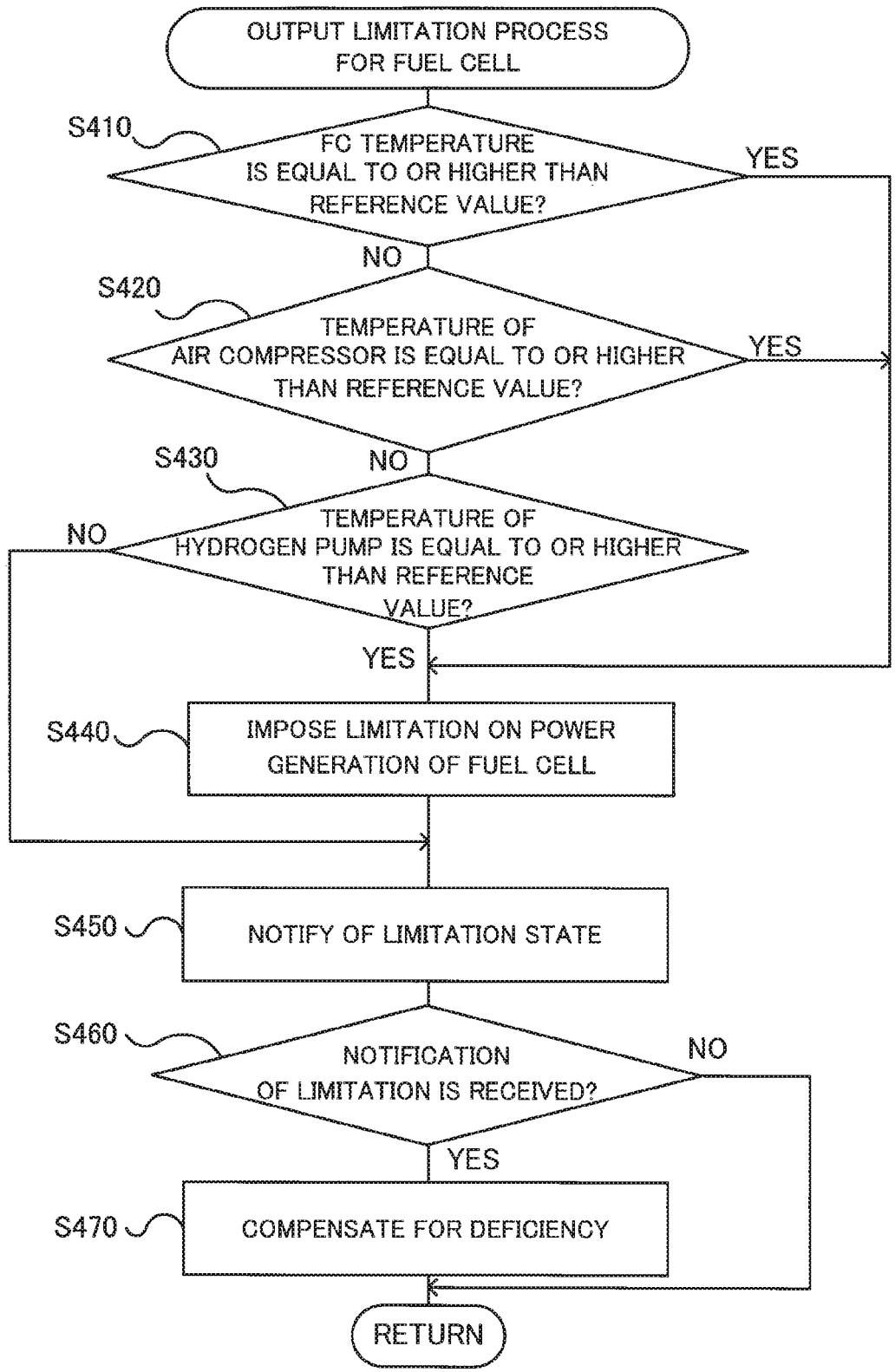
FIG. 9 is a flowchart showing an output limitation process for the fuel cell.

FIG. 9 is a flowchart showing an output limitation process for the fuel cell. The control unit 600 repeatedly performs this process during operation of the first fuel cell unit 20. Similarly, the control unit 600 repeatedly performs the other processes described later during operation of the first fuel cell unit 20.

The control unit 600 first determines whether the FC temperature is equal to or higher than a reference value (S410). This reference value is a value larger than the maximum value of the control target range described above. Irrespective of control of causing the FC temperature to fall within the control target range, the FC temperature is likely to exceed the maximum value of the control target range and furthermore reach the reference value, due to various factors. This phenomenon may similarly occur with regard to the other temperatures.

When the FC temperature is lower than the reference value (S410: NO), the control unit 600 subsequently determines whether the temperature of the air compressor 320 is equal to or higher than a reference value (S420). When the temperature of the air compressor 320 is lower than the reference value (S420: NO), the control unit 600 subsequently determines whether the temperature of the hydrogen pump 240 is equal to or higher than a reference value (S430).

When the temperature of the hydrogen pump 240 is lower than the reference value (S430: NO), the control unit 600 notifies the control unit 600A of the limitation state of power generation by the fuel cell 100 (S450). In the case of negative answers at all S410, S420, and S430, the control unit 600 notifies the control unit 600A of no limitation imposed.

The control unit 600 subsequently determines whether a notification of a limitation imposed is received from the control unit 600A (S460). When the notification of a limitation imposed is not received (S460: NO), the control unit 600 returns to S410 and repeats the series of processing from S410.

In the case of an affirmative answer at any of S410, S420, and S430, the control unit 600 limits electric power generation by the fuel cell 100 (S440). The limitation of power generation denotes power generation at an output lower than the power generation amount allocated to the fuel cell 100 (allocated power) or a stop of power generation. For example, when the levels of SOC of the secondary batteries 550 and 550A are maintained, the allocated power is half the required output. When the secondary batteries 550 and 550A are discharged, the allocated power is a value after subtraction of the discharged power from half the required output. The limitation of the power generation reduces the heat value of the fuel cell 100 as described above with reference to FIG. 7. As a result, the FC temperature is more likely to decrease.

The limitation of the power generation reduces the flow rate of the cathode gas required for power generation. This results in decreasing the rotation speed of the air compressor 320. The temperature of the air compressor 320 is more likely to decrease with a decrease in rotation speed of the air compressor 320.

Like the air compressor 320, the temperature of the hydrogen pump 240 is also more likely to decrease with a decrease in rotation speed of the hydrogen pump 240. Additionally, the hydrogen pump 240 is attached to a case (not shown) provided to place the fuel cell 100 therein, so that the temperature of the hydrogen pump 240 is affected by the FC temperature. Accordingly, the temperature of the hydrogen pump 240 is more likely to decrease with a decrease in FC temperature.

The control unit 600 subsequently performs the processing of S450. In this case, the control unit 600 notifies the control unit 600A of a limitation imposed on power generation and a deficient power value relative to the allocated power.

When receiving the notification of a limitation imposed on power generation from the control unit 600A (S460: YES), the control unit 600 increases the power generated by the fuel cell 100 to be larger than the allocated power, so as to compensate for the deficient power (S470). In this case, a condition that the power generated by the fuel cell 100 does not exceed the rated power generation amount Pfc is imposed.

Imposing such a condition may cause the power generated by the fuel cell 100 to fail to compensate for the deficiency. During a cruise drive according to the embodiment, the levels of SOC of the secondary batteries 550 and 550A are kept. In the event of the above deficiency, the required output is not satisfied. Accordingly, the output from the fuel cell system 15 is in limited condition.

Figure 10:
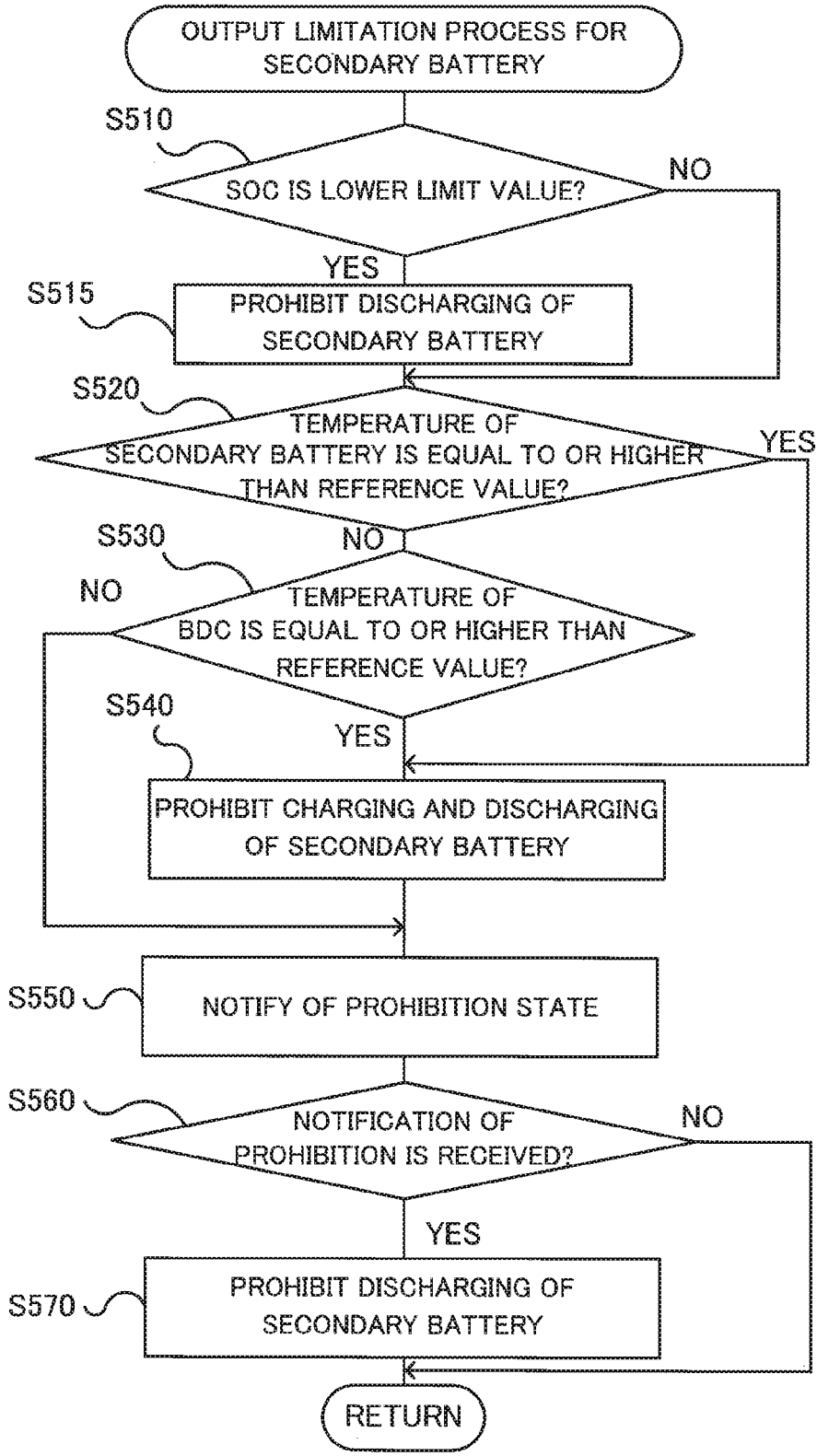
FIG. 10 is a flowchart showing an output limitation process for a secondary battery.

FIG. 10 is a flowchart showing an output limitation process for the secondary battery. The control unit 600 first determines whether the SOC of the secondary battery 550 is the lower limit value in the practical use range (S510). When the SOC is the lower limit value (S510: YES), the control unit 600 prohibits discharging of the secondary battery 550 (S515) and then proceeds to S520. When the SOC is higher than the lower limit value (S510: NO), the control unit 600 skips the processing of S515 and proceeds to S520.

The control unit 600 subsequently determine whether the temperature of the secondary battery 550 is equal to or higher than a reference value (first reference value) (S520). When the temperature of the secondary battery 550 is lower than the reference value (S520: NO), the control unit 600 subsequently determines whether the temperature of the BDC 560 is equal to or higher than a reference value (second reference value) (S530).

In the case of an affirmative answer at either of S520 and S530, the control unit 600 prohibits charging and discharging of the secondary battery 550 (S540) and proceeds to S550. Charging and discharging of the secondary battery 550 are prohibited, since charging and discharging cause heat generation by the secondary battery 550 and the BDC 560.

In the case of negative answers at both S520 and S530, the control unit 600 skips the processing of S540 and proceeds to S550.

The control unit 600 notifies the control unit 600A of the prohibition state of discharging of the secondary battery 550 (S550). When at least either the processing of S515 or the processing of S540 is performed, the control unit 600 notifies the control unit 600A of prohibition of discharging. When neither the processing of S515 nor the processing of S540 is performed, on the other hand, the control unit 600 notifies the control unit 600A of no prohibition of discharging.

The control unit 600 subsequently determines whether a notification of prohibition of discharging of the secondary battery 550A is received from the control unit 600A (S560). When the notification of prohibition of discharging is received (S560: YES), the control unit 600 prohibits discharging of the secondary battery 550 (S570) and returns to S510. When the notification of prohibition of discharging is not received (S560: NO), the control unit 600 skips the processing of S570 and returns to S510.

Prohibition of discharging of the secondary battery synchronously with the other fuel cell unit aims to maintain the SOC of the secondary battery.

In the case where discharging of the secondary battery 550A is prohibited, the state of the large required output is more likely to continue. This is because the fuel cell vehicle 10 is designed such that the electric power is supplied from the secondary batteries 550 and 550a to the drive motors 510 and 510A along with the electric power generated by the fuel cells 100 and 100A in the case where a large torque is required, for example, in the case of significant acceleration or in the case of going up a steep hill, while the secondary batteries 550 and 550A are not discharged in principle during a cruise drive as described above.

Discharging the secondary battery 550 in this state to compensate for the electric power that is originally to be supplied from the secondary battery 550A doubles the amount of discharge from the secondary battery 550, simply stated. When such a high power is supplied, there is a high possibility that charging and discharging of the secondary battery 550 is also prohibited in a short time period. Additionally, when the state of the large required output continues, the temperature of the fuel cell 100 or 100A or the like is likely to reach the reference value.

For such a case, prohibition of discharging of the secondary battery 550 to keep the SOC of the secondary battery 550 ensures the minimum driving power.

The controls of Embodiment 1 described above except some part are independently performed by the first fuel cell unit 20 and the second fuel cell unit 20A. This part includes the processing of S450 to S470 in the output limitation process for the fuel cell and the processing of S550 to S570 in the output limitation process for the secondary battery. The first fuel cell unit 20 and the second fuel cell unit 20A serve as one fuel cell system 15 and cooperatively perform the processing of these steps.

Except the above steps for output limitation, there is no need to change the design in the configuration of the first fuel cell unit 20 and the second fuel cell unit 20A from the configuration of a fuel cell system comprised of only one fuel cell unit. This accordingly simplifies the design for mounting two fuel cell systems on the fuel cell vehicle 10.

Embodiment 2 is described below. The description of Embodiment 2 mainly regards the configuration different from that of Embodiment 1. The configuration that is not specifically described below is similar to that of Embodiment 1.

It is preferable to prevent the output limitations of the fuel cell system 15 described above with reference to FIGS. 9 and 10 as much as possible. In Embodiment 1, the first fuel cell unit 20 and the second fuel cell unit 20A respectively perform the controls using the target range set 602 specified by the identical numerical values. This configuration suppresses the above output limitations from being performed frequently.

In Embodiment 2, in order to further decrease the frequency of the output limitations, the control units 600 and 600A perform processes to positively eliminate a deviation with regard to each of various parameters.

Figure 11:
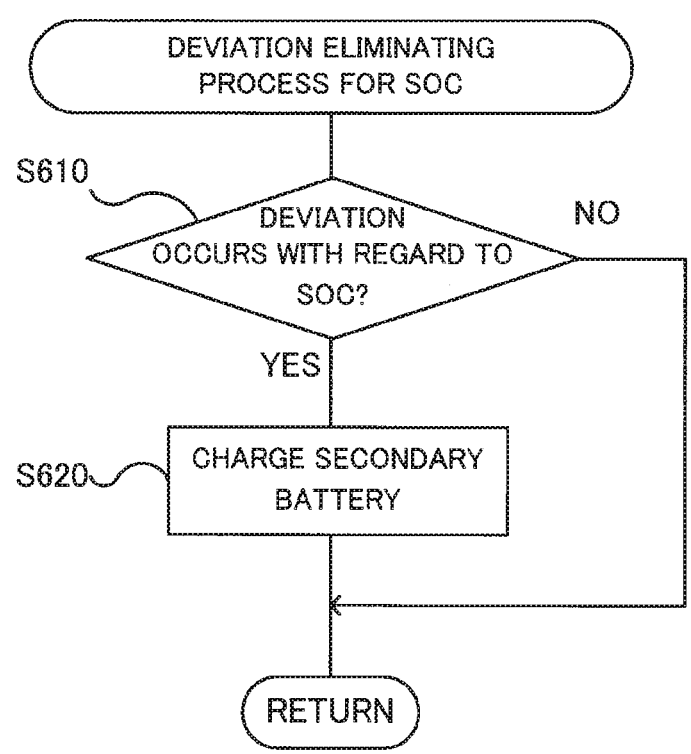
FIG. 11 is a flowchart showing a deviation eliminating process for SOC.

FIG. 11 is a flowchart showing a deviation eliminating process for the SOC. The control unit 600 determines whether a deviation occurs with regard to the SOC (S610). The occurrence of the deviation means that a difference by subtracting the SOC of the secondary battery 550 included in the first fuel cell unit 20 from the SOC of the secondary battery 550A included in the second fuel cell unit 20A is equal to or greater than a reference value. The reference value is a positive value. The necessary condition to make the above difference equal to or greater than the reference value is that the SOC of the secondary battery 550A is higher than the SOC of the secondary battery 550.

Accordingly, when the difference by subtracting the SOC of the secondary battery 550A from the SOC of the secondary battery 550 is equal to or greater than the reference value, the control unit 600 determines no occurrence of a deviation, whereas the control unit 600A determines the occurrence of a deviation.

The control unit 600 obtains the value of SOC of the secondary battery 550 from the BDC 560. The control unit 600 obtains the value of SOC of the secondary battery 550A from the control unit 600A. The control unit 600 similarly obtains a control parameter with regard to output of the second fuel cell unit 20A from the control unit 600A in any of deviation eliminating processes of temperatures described below.

The difference in SOC is to be compared with the reference value as described above, since it is determined that no deviation occurs even when the SOC values are not completely the same but are close values. This configuration prevents the operation for eliminating the deviation from being performed with high frequency.

When no deviation occurs with regard to the SOC (S610: NO), the control unit 600 repeats the determination of S610. When a deviation occurs with regard to the SOC (S610: YES), the control unit 600 charges the secondary battery 550 with the power generated by the fuel cell 100 (S620) and performs the determination of S610 again. The control unit 600 controls the power generation of the fuel cell 100 not to exceed the rated power generation amount Pfc in the process of charging at S620.

Figure 12:
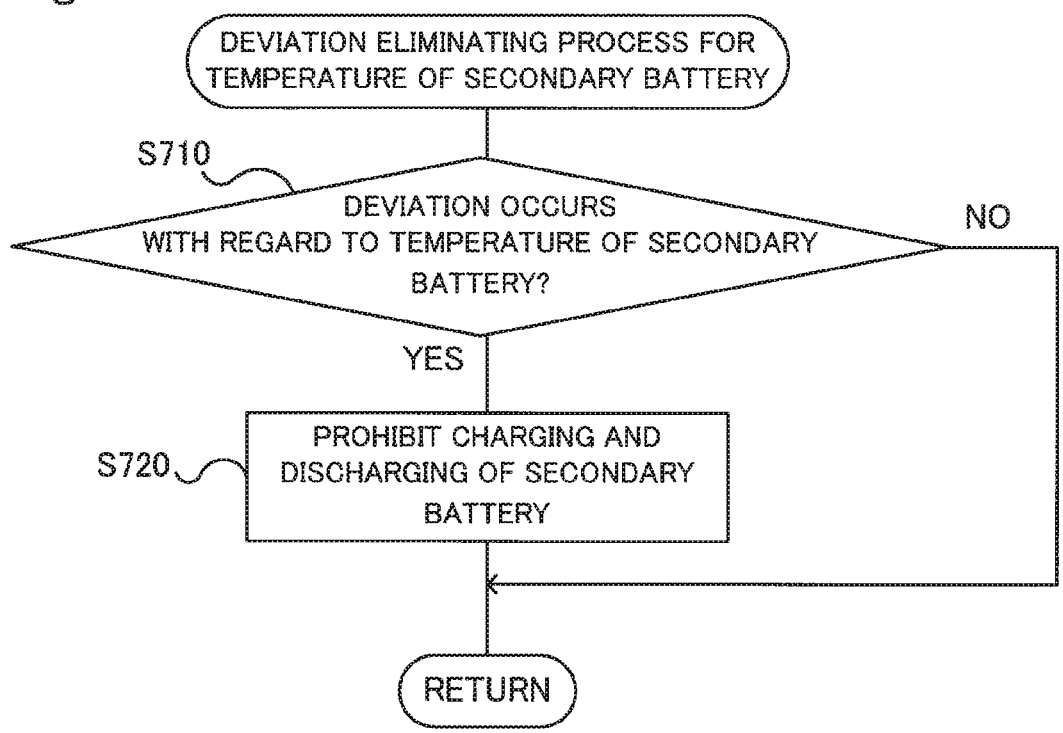
FIG. 12 is a flowchart showing a deviation eliminating process for temperature of the secondary battery.

FIG. 12 is a flowchart showing a deviation eliminating process for the temperature of the secondary battery. The control unit 600 determines whether a deviation occurs with regard to the temperature of the secondary battery (S710). The occurrence of the deviation means that a difference by subtracting the temperature of the secondary battery 550A included in the second fuel cell unit 20A from the temperature of the secondary battery 550 included in the first fuel cell unit 20 is equal to or greater than a reference value. The reference value is a positive value. The necessary condition to make the above difference equal to or greater than the reference value is that the temperature of the secondary battery 550 is higher than the temperature of the secondary battery 550A.

Accordingly, when the difference by subtracting the temperature of the secondary battery 550 from the temperature of the secondary battery 550A is equal to or greater than the reference value, the control unit 600 determines no occurrence of a deviation, whereas the control unit 600A determines the occurrence of a deviation. The reference value used at S710 is also called predetermined value.

The concept on the occurrence of a deviation similarly applies to deviation eliminating processes of the other temperatures described later and is thus not specifically mentioned in description of the deviation eliminating processes of the other temperatures.

When no deviation occurs with regard to the temperature of the secondary battery 550 (S710: NO), the control unit 600 repeats the determination of S710. When a deviation occurs with regard to the temperature of the secondary battery 550 (S710: YES), the control unit 600 prohibits charging and discharging of the secondary battery 550 (S720) and then repeats the determination of S710.

Figure 13:
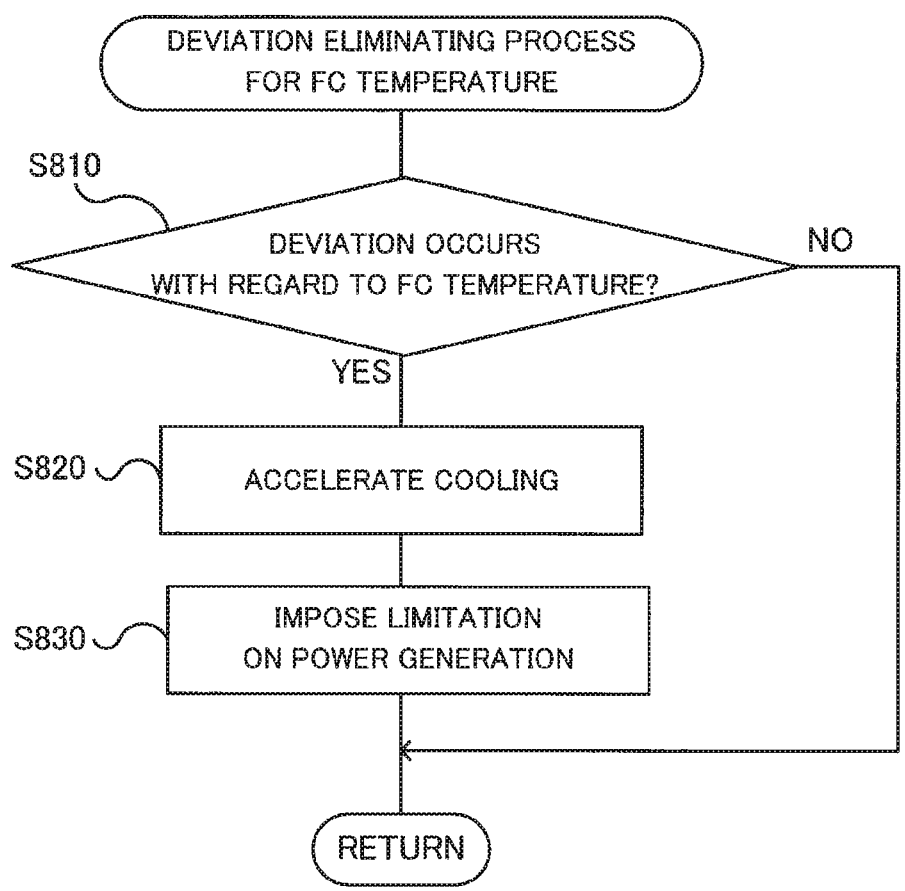
FIG. 13 is a flowchart showing a deviation eliminating process for FC temperature.

FIG. 13 is a flowchart showing a deviation eliminating process for the FC temperature. The control unit 600 determines whether a deviation occurs with regard to the FC temperature (S810). When no deviation occurs with regard to the FC temperature (S810: NO), the control unit 600 repeats the determination of S810.

When a deviation occurs with regard to the FC temperature (S810: YES), the control unit 600 enhances the cooling capacity of the FC cooling mechanism 400 (S820). More specifically, the control unit increases the rotation speed of the water pump 430 and the rotation speed of the electric fan 411 of the radiator 410.

The control unit 600 subsequently limits electric power generation by the fuel cell 100 (S830). The limitation is imposed at S830 by using the FDC 590 to increase the generated voltage of the fuel cell 100. The control unit 600 then repeats the series of processing from S810. The control unit 600, however, does not unlimitedly accelerate cooling at S820 in response to every affirmative answer at S810 but performs appropriate feedback control. The same applies to the limitation at S830.

Figure 14:
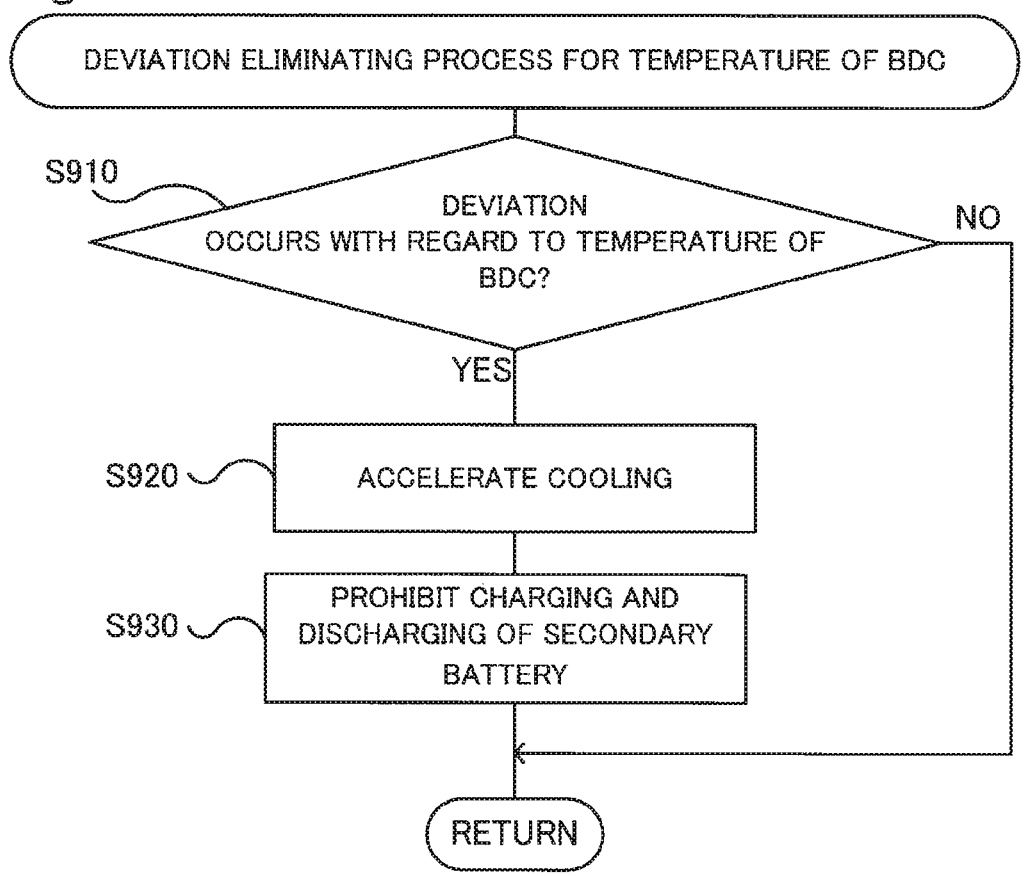
FIG. 14 is a flowchart showing a deviation eliminating process for temperature of a BDC.

FIG. 14 is a flowchart showing a deviation eliminating process for the temperature of the BDC. The control unit 600 determines whether a deviation occurs with regard to the temperature of the BDC (S910). When no deviation occurs with regard to the temperature of the BDC (S910: NO), the control unit 600 repeats the determination of S910.

When a deviation occurs with regard to the temperature of the BDC (S910: YES), the control unit 600 increases the rotation speed of the water pump and the rotation speed of the electric fan included in the auxiliary machinery cooling mechanism 490 to accelerate cooling of the BDC 560 (S920). The control unit 600 subsequently prohibits charging and discharging of the secondary battery 550 (S930). The control unit 600 then repeats this deviation eliminating process from S910.

Figure 15:
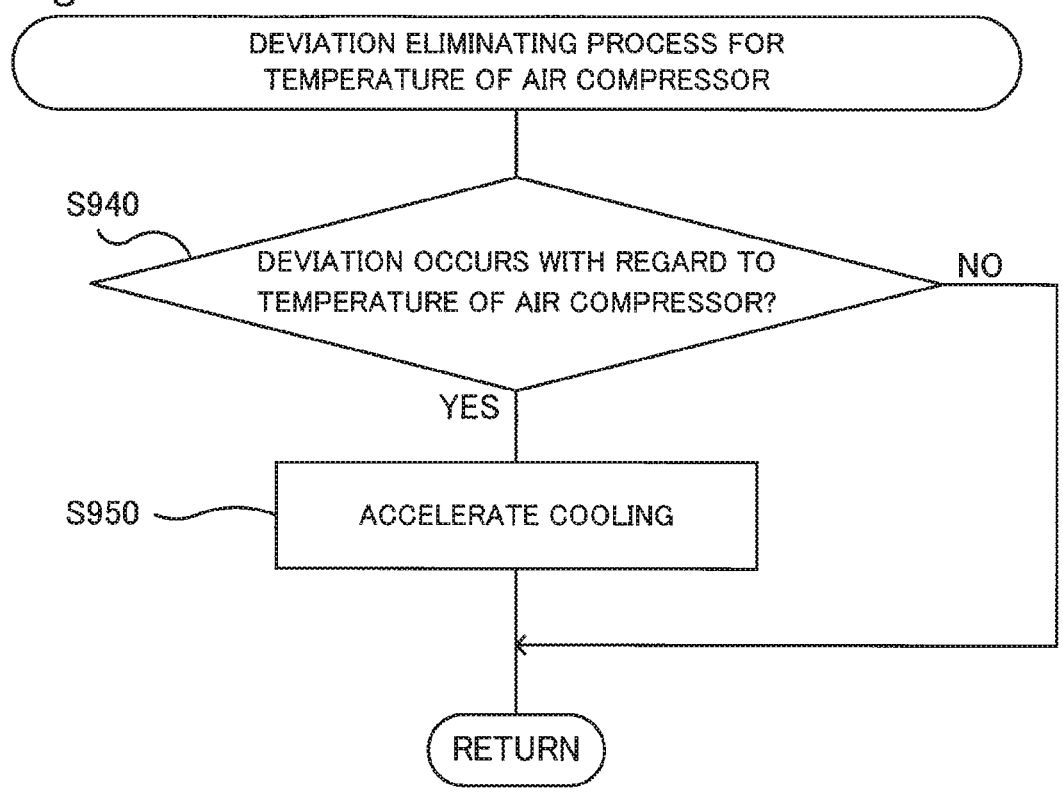
FIG. 15 is a flowchart showing a deviation eliminating process for temperature of an air compressor.

FIG. 15 is a flowchart showing a deviation eliminating process for the temperature of the air compressor. The control unit 600 determines whether a deviation occurs with regard to the temperature of the air compressor 320 (S940). When no deviation occurs with regard to the temperature of the air compressor 320 (S940: NO), the control unit 600 repeats this deviation eliminating process from S940.

When a deviation occurs with regard to the temperature of the air compressor 320 (S940: YES), the control unit 600 uses the auxiliary machinery cooling mechanism 490 to accelerate cooling of the air compressor 320 (S950). The control unit 600 then repeats this deviation eliminating process from S940.

When the rotation speed of the air compressor 320 is reduced, an appropriate stoichiometric ratio of a cathode gas for a required power generation amount is unlikely to be maintained. This reduces the power generated by the fuel cell 100. Compensation for a deficient power by the second fuel cell unit 20A may increase a deviation of the FC temperature and cause divergence of control. Accordingly, the process of this embodiment does not reduce the rotation speed of the air compressor 320 for the purpose of eliminating a deviation with regard to the temperature of the air compressor 320.

Figure 16:
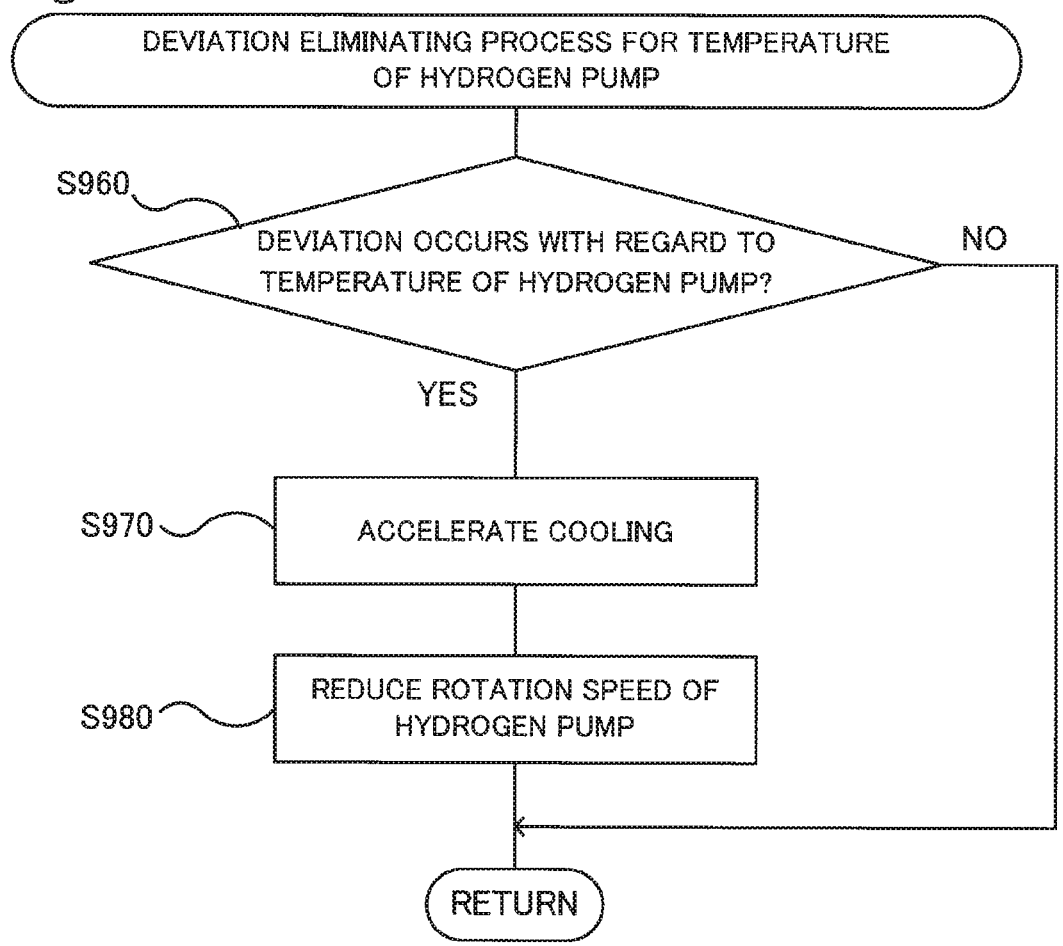
FIG. 16 is a flowchart showing a deviation eliminating process for temperature of a hydrogen pump.

FIG. 16 is a flowchart showing a deviation eliminating process for the temperature of the hydrogen pump. The control unit 600 determines whether a deviation occurs with regard to the temperature of the hydrogen pump 240 (S960). When no deviation occurs with regard to the temperature of the hydrogen pump 240 (S960: NO), the control unit 600 repeats this deviation eliminating process from S960.

When a deviation occurs with regard to the temperature of the hydrogen pump 240 (S960: YES), the control unit 600 uses the auxiliary machinery cooling mechanism 490 to accelerate cooling of the hydrogen pump 240 (S970). The control unit 600 subsequently reduces the rotation speed of the hydrogen pump 240, in order to suppress heat generation of the hydrogen pump 240 (S980). The control unit 600 then repeats this deviation eliminating process from S960.

Even when the rotation speed of the hydrogen pump 240 is reduced, a stoichiometric ratio of an anode gas for a required power generation amount may be maintained by increasing the supply amount of hydrogen stored in the hydrogen tank 210.

The disclosure is not limited to any of the aspects and the embodiments described above but may be implemented by a diversity of other configurations without departing from the scope of the disclosure. For example, the technical features of any of the aspects and the embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein. Some examples of the other configurations are given below.

Numerical ranges as target ranges of one control parameter included in the target range set stored in the control unit 600 and included in the target range set stored in the control unit 600A only need to at least partly overlap with each other. The overlap herein means the presence of any overlapping range. Accordingly, different values may be allowed for at least either of the maximum value and the minimum value specifying the target range.

The maximum value and the minimum value specifying the target range may be equal to each other. In this case, the target range does not have any extent but is specified as only one numerical value. In the description hereof, even such a numerical value is also called the target range. In the case where the target range is specified as only one numerical value, at least partly overlapping means that the respective only one numerical values are equal to each other.

At least one of the parameters only needs to have a partly overlapping target range.

Prohibition of charging and discharging of the secondary battery may be replaced by limitation on charging and discharging of the secondary battery, except in the case where the SOC of the secondary battery is the lower limit value. The limitation on charging and discharging herein means that charging and discharging are allowed under the condition that a charging or discharging power is lower than an ordinary level.

The deviation of SOC may be eliminated by discharging the secondary battery having the higher SOC, in addition to charging the secondary battery having the lower SOC.

The deviation of temperature may be eliminated by increasing the temperature of the device having the lower temperature, in addition to cooling down the device having the higher temperature (for example, fuel cell).

At least one of the FC temperature, the temperature of the air compressor, the temperature of the hydrogen pump and the temperature of the BDC may be obtained by estimation without using a temperature sensor.

The motor truck as the fuel cell vehicle is not limited to the configuration pulling a trailer but may be, for example, a full trailer or a dump truck.

The fuel cell system may include three or more fuel cell units.

The machine with the fuel cell system mounted thereon is not limited to the motor truck but may be any machine having the function of moving by driving a motor, for example, construction machines, robots and transportation equipment other than motor vehicles. The robots include walking robots on the ground, wheel-mobile robots on the ground and flying robots in the sky. The transportation equipment other than motor vehicles include trains, two-wheel vehicles and helicopters.

The fuel cell vehicle may be a connected car. The connected car denotes a motor vehicle equipped with a communication device to receive services by communication with cloud services.

Figure 17:
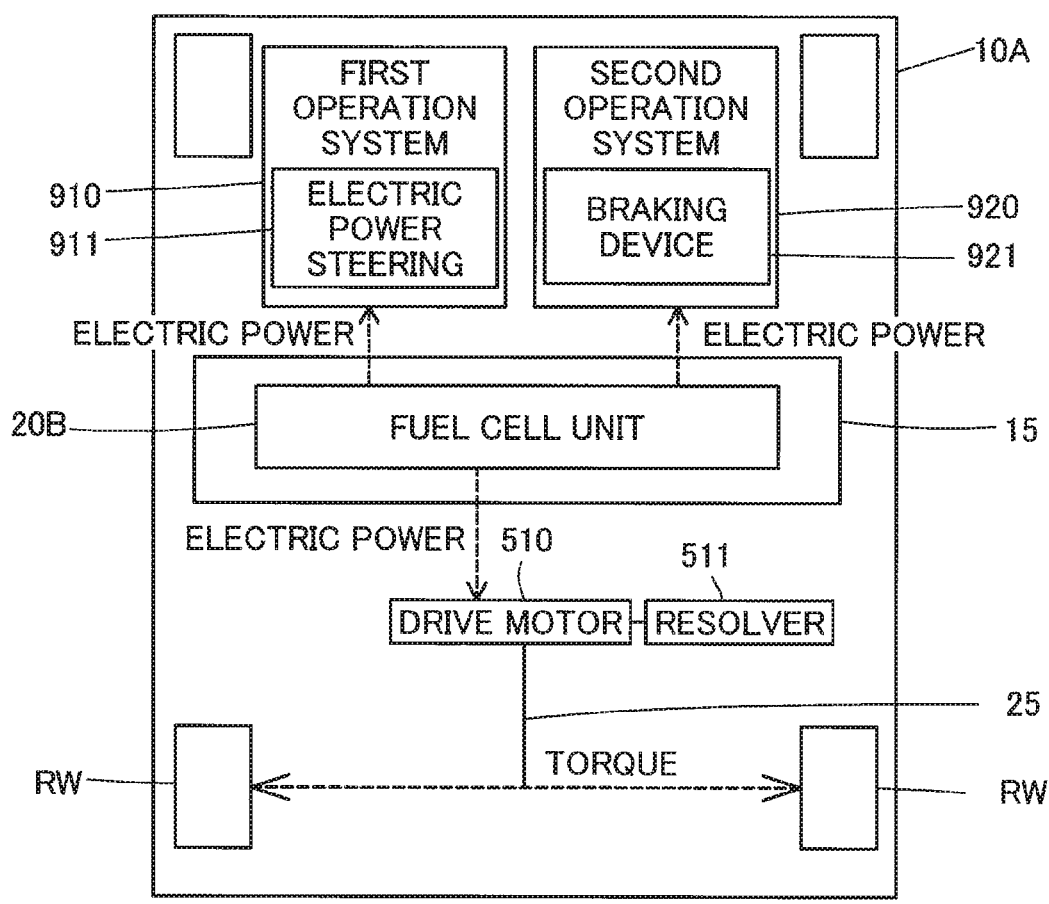
FIG. 17 is a configuration diagram illustrating another fuel cell vehicle.

FIG. 17 illustrates a fuel cell vehicle 10A. The configuration of the fuel cell vehicle 10A that is not specifically described is identical with that of the fuel cell vehicle 10. The fuel cell vehicle 10A is a passenger vehicle. A fuel cell system 15 mounted on the fuel cell vehicle 10A is comprised of one fuel cell unit 20B. In the fuel cell vehicle 10A, the fuel cell unit 20B is identical with the fuel cell system 15.

As described in Embodiment 1, the same controls except some steps are independently performed by the first fuel cell unit 20 and the second fuel cell unit 20A. The fuel cell unit 20B mounted on the fuel cell vehicle 10A performs the controls that are respectively performed by the first fuel cell unit 20 and the second fuel cell unit 20A described in Embodiment 1, except the above some steps.

For example, the fuel cell unit 20B performs the charging-time temperature control process. The charging-time temperature control process performed by the fuel cell unit 20B may be based on the following technical concept.

A fuel cell system comprising a secondary battery configured to supply power to a load; a fuel cell configured to generate power, in order to supply the power to at least either the load or the secondary battery; a fuel cell cooling mechanism including a radiator configured to cool down the fuel cell; and a control unit configured to control power generation by the fuel cell and control the fuel cell cooling mechanism. The fuel cell system is mounted on a machine having a moving function. When the power generated by the fuel cell is used to perform charging of the secondary battery and the power supply to the load simultaneously, the control unit determines the power generated by the fuel cell, based on a cooling capacity of the radiator that is estimated from an ambient temperature and a moving speed of the machine.

What is claimed is:
1. A fuel cell system comprising:
a first fuel cell unit and a second fuel cell unit, each of the first fuel cell unit and the second fuel cell unit comprising:
 a secondary battery configured to supply electric power to a load;
 a converter configured to measure an SOC of the secondary battery and to control charging and discharging of the secondary battery;
 a fuel cell electrically connected with the converter; and
 a control unit configured to obtain a value of SOC from the converter and to control the converter, wherein
the control unit included in the first fuel cell unit is programmed to control the converter included in the first fuel cell unit using a control target determined with regard to the SOC of the secondary battery included in the first fuel cell unit, the control unit included in the second fuel cell unit is programmed to control the converter included in the second fuel cell unit using a control target determined with regard to the SOC of the secondary battery included in the second fuel cell unit, when the SOC of the secondary battery included in the first fuel cell unit reaches a reference value that is smaller than a minimum value of the control target, the control unit included in the first fuel cell unit is programmed to prohibit discharging of the secondary battery included in the first fuel cell unit, and the control unit included in the second fuel cell unit is programmed to prohibit discharging of the secondary battery included in the second fuel cell unit, and the control targets with regard to the SOC of the secondary battery used by the control unit included in the first fuel cell unit and by the control unit included in the second fuel cell unit have numerical ranges that at least partly overlap with each other.

2. The fuel cell system according to claim 1, wherein
the control unit included in the first fuel cell unit is programmed to perform a start-time charging process that charges the secondary battery included in the first fuel cell unit toward a target value using a power generated by the fuel cell included in the first fuel cell unit at a start time of the fuel cell system, and the control unit included in the second fuel cell unit is programmed to perform a start-time charging process that charges the secondary battery included in the second fuel cell unit toward the target value using a power generated by the fuel cell included in the second fuel cell unit at the start time of the fuel cell system.

3. The fuel cell system according to claim 1, wherein
the first fuel cell unit further comprises a fuel cell cooling mechanism configured to cool down the fuel cell included in the first fuel cell unit, and the control unit included in the first fuel cell unit is programmed to increase a cooling capacity of the fuel cell cooling mechanism when charging of the secondary battery included in the first fuel cell unit and power supply to the load are simultaneously performed by using an electric power generated by the fuel cell included in the first fuel cell unit.

4. The fuel cell system according to claim 3,
the fuel cell system being mounted on a machine having a moving function, wherein the fuel cell cooling mechanism includes a radiator configured to cool down the fuel cell included in the first fuel cell unit, and the control unit included in the first fuel cell unit is programmed to determine the electric power generated by the fuel cell included in the first fuel cell unit, based on a cooling capacity of the radiator that is estimated from an ambient temperature and a moving speed of the machine, when the charging of the secondary battery and the electric power supply to the load are simultaneously performed.

5. The fuel cell system according to claim 1, wherein
when a difference by subtracting the SOC of the secondary battery included in the first fuel cell unit from the SOC of the secondary battery included in the second fuel cell unit is equal to or greater than a reference value, the control unit included in the first fuel cell unit is programmed to charge the secondary battery included in the first fuel cell unit by using electric power generated by the fuel cell included in the first fuel cell unit.

* * * * *